(12) United States Patent
Garavoglia et al.

(10) Patent No.: US 9,841,211 B2
(45) Date of Patent: Dec. 12, 2017

(54) HYDRODYNAMIC HEATER

(71) Applicant: Ventech, LLC, Wixom, MI (US)

(72) Inventors: Franco Garavoglia, Walled Lake, MI (US); Jeremy Sanger, Milford, MI (US)

(*) Notice: Subject to any disclaimer, the term of this patent is extended or adjusted under 35 U.S.C. 154(b) by 93 days.

(21) Appl. No.: 14/834,138

(22) Filed: Aug. 24, 2015

(65) Prior Publication Data
US 2017/0059207 A1    Mar. 2, 2017

(51) Int. Cl.
*F24J 3/00*    (2006.01)
*F24H 9/20*    (2006.01)

(52) U.S. Cl.
CPC .................................. *F24H 9/2007* (2013.01)

(58) Field of Classification Search
CPC ............................ F24J 3/003; B60H 2001/146
USPC ....... 122/11, 26, 28, 406.1, 411; 237/12.3 B, 237/12.3 R, 8 R; 126/247
See application file for complete search history.

(56) References Cited

U.S. PATENT DOCUMENTS

| | | | |
|---|---|---|---|
| 1,760,402 A | 5/1930 | Derrick | |
| 1,915,547 A | 6/1933 | North et al. | |
| 2,428,005 A | 9/1947 | Bennett | |
| 2,496,497 A | 2/1950 | Russell | |
| 2,541,227 A | 2/1951 | Findley | |
| 2,570,768 A | 10/1951 | Clerk | |
| 2,672,954 A | 3/1954 | Bennett | |
| 2,748,762 A | 6/1956 | Booth | |
| 2,748,899 A | 6/1956 | Booth et al. | |
| 2,749,049 A | 6/1956 | Smith | |
| 2,750,009 A | 6/1956 | Pohl | |
| 2,827,989 A | 3/1958 | Christenson | |
| 2,889,013 A | 6/1959 | Schneider | |
| 2,990,919 A | 7/1961 | Christenson et al. | |
| 3,024,876 A | 3/1962 | Montgomery | |
| 3,051,273 A | 8/1962 | Cordiano et al. | |
| 3,136,392 A | 6/1964 | Rodway | |
| 3,139,158 A | 6/1964 | Sieving | |
| 3,146,863 A | 9/1964 | Herbenar et al. | |
| 3,164,961 A | 1/1965 | Schroder | |
| 3,178,889 A | 4/1965 | Nelden | |
| 3,265,162 A | 8/1966 | Botterill | |
| 3,270,838 A | 9/1966 | Schweizer | |
| 3,330,386 A | 7/1967 | Bertram et al. | |

(Continued)

*Primary Examiner* — Gregory A Wilson
(74) *Attorney, Agent, or Firm* — Checkowsky Law PLLC; Dan Checkowsky

(57) ABSTRACT

A hydrodynamic heater includes an inlet port for receiving a stream of fluid from an external source and an outlet port for discharging a stream of heated fluid from the hydrodynamic heater. A hydrodynamic chamber operates to selectively heat fluid present within an interior region of the hydrodynamic chamber. The hydrodynamic chamber includes an inlet port located proximate a center of the interior region of the hydrodynamic chamber and an outlet port located along an interior wall of the hydrodynamic chamber. The hydrodynamic chamber inlet port is fluidly connected to the inlet port of the hydrodynamic heater. The hydrodynamic heater includes a control valve fluidly connected to the hydrodynamic chamber outlet port and the hydrodynamic heater outlet port. A fluid metering device connected in series with the control valve is fluidly connected to the hydrodynamic chamber outlet port and the hydrodynamic heater outlet port.

32 Claims, 10 Drawing Sheets

(56) References Cited

U.S. PATENT DOCUMENTS

| | | | | |
|---|---|---|---|---|
| 3,405,524 | A | 10/1968 | Nelden | |
| 3,451,511 | A | 6/1969 | Knapp | |
| 3,467,225 | A | 9/1969 | Steffen et al. | |
| 3,512,616 | A | 5/1970 | Berssiere | |
| 3,591,079 | A | 7/1971 | Peters | |
| 3,601,211 | A | 8/1971 | Finke | |
| 3,650,358 | A | 3/1972 | Bessiere | |
| 3,684,335 | A | 8/1972 | Franke et al. | |
| 3,720,372 | A | 3/1973 | Jacobs | |
| 3,756,028 | A | 9/1973 | Bopp et al. | |
| 3,774,734 | A | 11/1973 | Forster et al. | |
| 3,774,735 | A | 11/1973 | Hanke et al. | |
| 3,860,097 | A | 1/1975 | Braschler et al. | |
| 3,888,335 | A | 6/1975 | Hanke | |
| 3,919,844 | A | 11/1975 | Elderton | |
| 3,924,713 | A | 12/1975 | Bessiere | |
| 3,941,224 | A | 3/1976 | Hanke | |
| 3,952,508 | A * | 4/1976 | Bopp | F16D 33/02 188/296 |
| 3,989,127 | A | 11/1976 | Staudenmaier et al. | |
| 4,004,660 | A | 1/1977 | Shore et al. | |
| 4,043,434 | A | 8/1977 | Braschler | |
| 4,061,214 | A | 12/1977 | Ternehall | |
| 4,073,139 | A | 2/1978 | Armasow et al. | |
| 4,175,647 | A | 11/1979 | Hanke | |
| 4,201,050 | A | 5/1980 | Nixel | |
| 4,257,504 | A | 3/1981 | Hanke | |
| 4,276,970 | A | 7/1981 | Herrmann et al. | |
| 4,373,666 | A | 2/1983 | Williams | |
| 4,405,038 | A | 9/1983 | Ternehall | |
| 4,411,340 | A | 10/1983 | Brosius et al. | |
| 4,430,966 | A | 2/1984 | Marandet et al. | |
| 4,432,442 | A | 2/1984 | Vogelsang | |
| 4,440,272 | A | 4/1984 | Bieber | |
| 4,454,935 | A | 6/1984 | Pryor | |
| 4,458,792 | A | 7/1984 | Thomas et al. | |
| 4,474,270 | A | 10/1984 | Vogelsang | |
| 4,493,293 | A * | 1/1985 | Paul | B60H 1/03 123/142.5 R |
| 4,538,553 | A | 9/1985 | Kurz et al. | |
| 4,597,481 | A | 7/1986 | Muller et al. | |
| 4,671,061 | A | 6/1987 | Elberton | |
| 4,699,022 | A | 10/1987 | Stadt et al. | |
| 4,773,513 | A | 9/1988 | Herrmann et al. | |
| 4,836,341 | A | 6/1989 | Hall | |
| 4,922,872 | A | 5/1990 | Nogami et al. | |
| 4,938,323 | A | 7/1990 | Holler et al. | |
| 4,974,778 | A | 12/1990 | Bertling | |
| 5,090,523 | A | 2/1992 | Vogelsang | |
| 5,174,334 | A | 12/1992 | Nogle | |
| 5,193,654 | A | 3/1993 | Vogelsang | |
| 5,333,707 | A * | 8/1994 | Kaneda | B60T 1/087 188/290 |
| 5,657,723 | A | 8/1997 | Edelmann et al. | |
| 5,657,838 | A * | 8/1997 | Vogelsang | B60T 1/087 188/154 |
| 5,683,031 | A * | 11/1997 | Sanger | F24J 3/003 126/247 |
| 5,752,499 | A | 5/1998 | Mori et al. | |
| 5,788,151 | A | 8/1998 | Moroi et al. | |
| 5,794,588 | A | 8/1998 | Vogelsang et al. | |
| 5,819,697 | A | 10/1998 | Edelmann et al. | |
| 5,829,562 | A | 11/1998 | Adams et al. | |
| 5,845,608 | A | 12/1998 | Ban et al. | |
| 5,873,342 | A | 2/1999 | Friedrich et al. | |
| 5,934,097 | A | 8/1999 | Karl | |
| 6,058,928 | A | 5/2000 | Sitko et al. | |
| 6,082,316 | A * | 7/2000 | Ban | B60H 1/038 122/26 |
| 6,116,514 | A | 9/2000 | Moroi et al. | |
| 6,167,993 | B1 | 1/2001 | Adams et al. | |
| 6,234,285 | B1 * | 5/2001 | Friedrich | B60T 1/087 188/290 |
| 6,896,191 | B2 | 4/2003 | Augenstein et al. | |
| 6,558,112 | B2 * | 5/2003 | Moroi | B60H 1/03 415/1 |
| 6,561,324 | B2 | 5/2003 | Friedrich et al. | |
| 6,811,374 | B2 | 11/2004 | Brisson et al. | |
| 6,811,375 | B2 | 11/2004 | Brisson et al. | |
| 7,069,728 | B2 | 7/2006 | Bruno et al. | |
| 7,318,553 | B2 | 1/2008 | Thoma | |
| 7,387,262 | B2 | 6/2008 | Thoma | |
| 8,469,283 | B2 * | 6/2013 | Sanger | F24J 3/003 122/1 R |
| 8,726,870 | B2 * | 5/2014 | Cronin | F24J 3/003 123/142.5 R |
| 2005/0205682 | A1 * | 9/2005 | Sanger | B60H 1/00314 237/10 |
| 2008/0060375 | A1 * | 3/2008 | Sanger | B60H 1/00485 62/265 |

* cited by examiner

FIG. 3
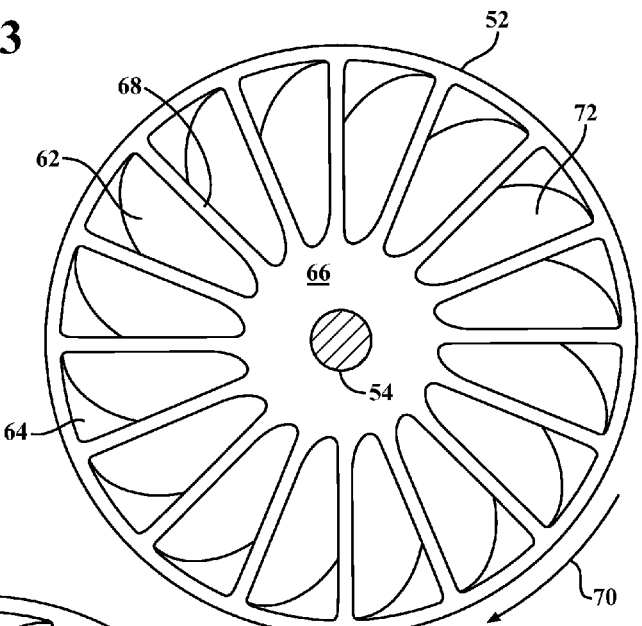
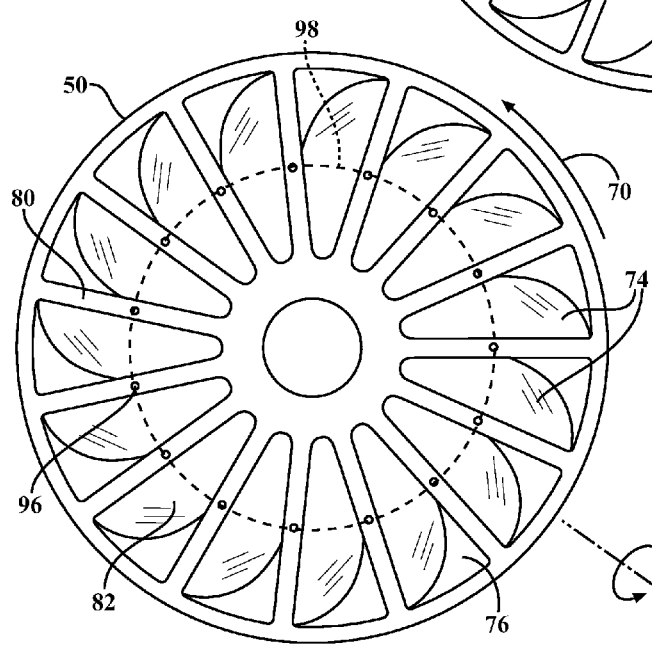
FIG. 4
FIG. 5
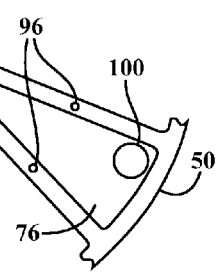

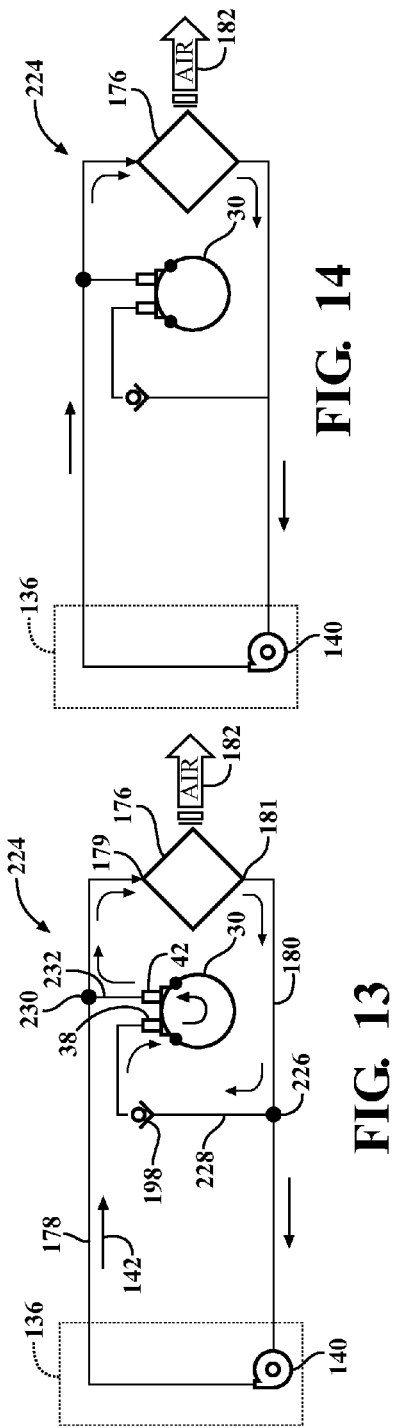
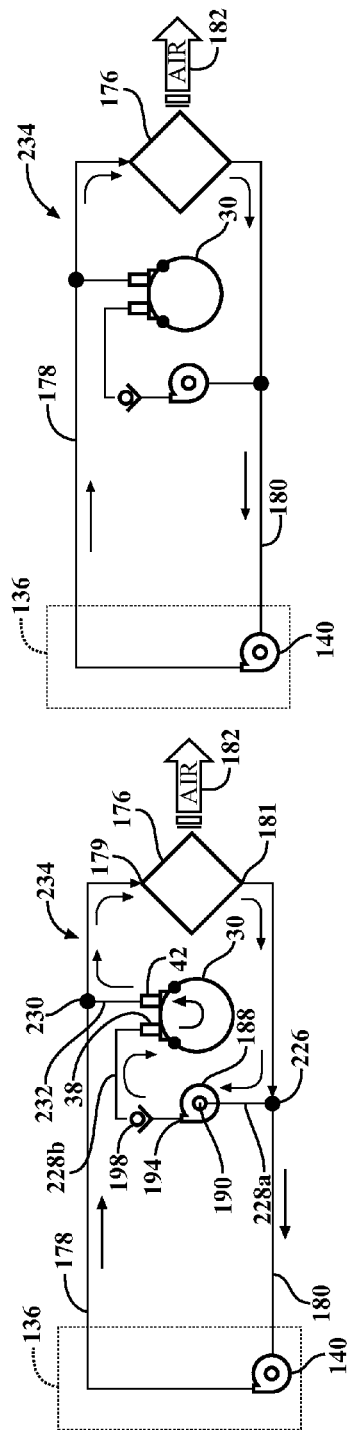
FIG. 13
FIG. 14
FIG. 15
FIG. 16

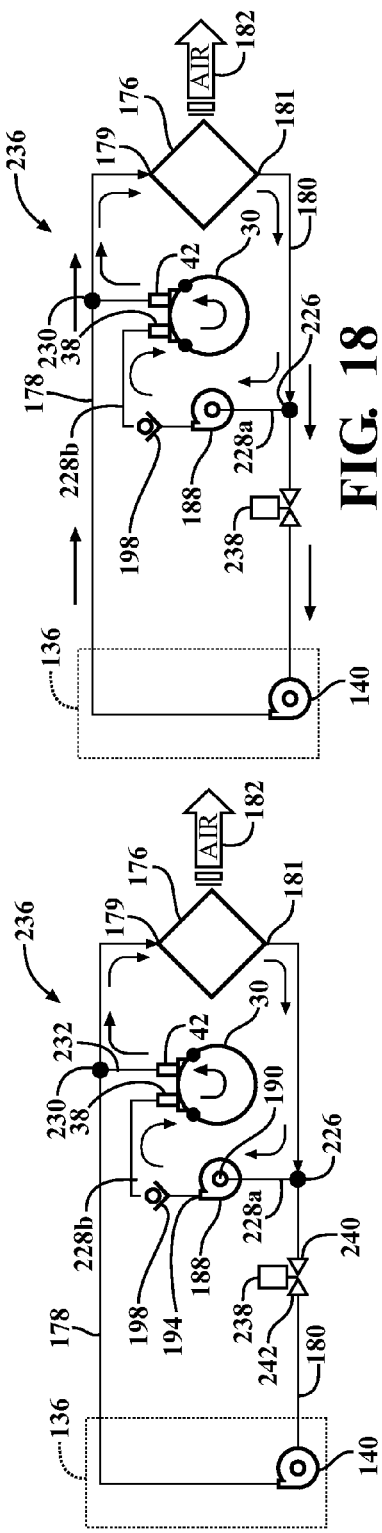
FIG. 17
FIG. 18
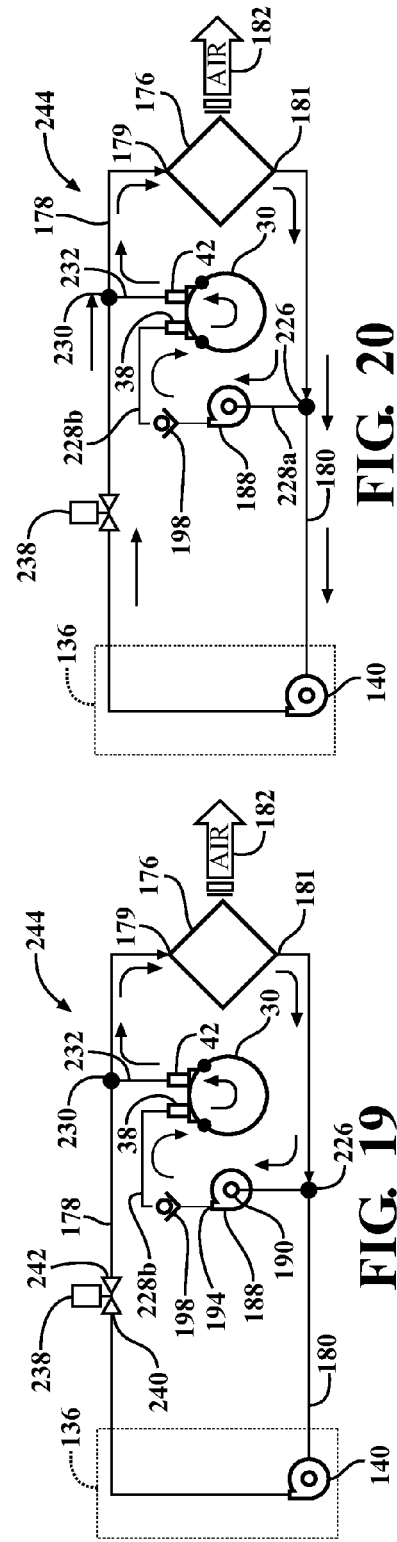
FIG. 19
FIG. 20

HYDRODYNAMIC HEATER

BACKGROUND

Conventional automotive vehicles typically include a heating system for supplying warm air to a passenger compartment of the vehicle. The heating system includes a control system that allows a vehicle operator to regulate the quantity and/or temperature of air delivered to the passenger compartment so as to achieve a desirable air temperature within the passenger compartment. Cooling fluid from the vehicle's engine cooling system is commonly used as a source of heat for heating the air delivered to the passenger compartment.

The heating system typically includes a heat exchanger fluidly connected to the vehicle's engine cooling system. Warm cooling fluid from the engine cooling system passes through the heat exchanger and gives up heat to a cool air supply flowing through the heating system. The heat energy transferred from the warm cooling fluid to the cool air supply causes the temperature of the air to rise. The heated air is discharged into the passenger compartment to warm the interior of the vehicle to a desired air temperature.

The vehicle's engine cooling system provides a convenient source of heat for heating the vehicle's passenger compartment. One disadvantage of using the engine cooling fluid as a heat source, however, is that there is typically a significant delay between when the vehicle's engine is first started and when the heating system begins supplying air at a preferred temperature. This is particularly true when the vehicle is operated in very cold ambient conditions or has sat idle for a period of time. The delay is due to the cooling fluid being at substantially the same temperature as the air flowing through the heating system and into the passenger compartment when the engine is first started. As the engine continues to operate, a portion of the heat generated as a byproduct of combusting a mixture of fuel and air in the engine cylinders is transferred to the cooling fluid, causing the temperature of the cooling fluid to rise. Since, the temperature of the air being discharged from the heating system is a function of the temperature of the cooling fluid passing through the heat exchanger, the heating system will produce proportionally less heat while the engine cooling fluid is warming up than when the cooling fluid is at a preferred operating temperature. Thus, there may be an extended period of time between when the vehicle's engine is first started and when the heating system begins producing air at an acceptable temperature level. The time it takes for this to occur will vary depending on various factors, including the initial temperature of the cooling fluid and the initial temperature of the air being heated. It is preferable that the temperature of the cooling fluid reach its preferred operating temperature as quickly as possible.

Another potential limitation of using the engine cooling fluid as a heat source for the vehicle's heating system is that under certain operating conditions the engine may not be rejecting enough heat to the cooling fluid to enable the air stream from the vehicle's heating system to achieve a desired temperature. This may occur, for example, when operating a vehicle with a very efficient engine under a low load condition or in conditions where the outside ambient temperature is unusually cold. Both of these conditions reduce the amount of heat that needs to be transferred from the engine to the cooling fluid to maintain a desired engine operating temperature. This results in less heat energy available for heating the air flowing through the vehicle's heating system.

Accordingly it is desirable to develop a heating system capable of intermittently providing additional heating of an engine's cooling fluid so as to improve the heating efficiency of the vehicles' passenger compartment heating system.

SUMMARY

Disclosed is hydrodynamic heater operable for generating a stream of heated fluid. The hydrodynamic heater includes an inlet port for receiving a stream of fluid from an external source and an outlet port for discharging a stream of heated fluid from the hydrodynamic heater. The hydrodynamic heater includes a stator and a rotor positioned adjacent the stator. The stator and rotor together define a hydrodynamic chamber operable for heating a fluid. The rotor is mounted to a drive shaft and rotatable relative to the stator. The hydrodynamic chamber operates to heat fluid present within an interior of the hydrodynamic chamber. The hydrodynamic chamber includes an inlet port located proximate a center of the interior region of the hydrodynamic chamber and an outlet port located along an interior wall of the hydrodynamic chamber. The hydrodynamic chamber inlet port is fluidly connected to the inlet port of the hydrodynamic heater. The hydrodynamic heater may also include a control valve fluidly connected to the hydrodynamic chamber outlet port and the hydrodynamic heater outlet port. A fluid metering device connected in series with the control valve may be fluidly connected to the hydrodynamic chamber outlet port and the hydrodynamic heater outlet port. Heated fluid from the hydrodynamic chamber may be discharged from the outlet port of the hydrodynamic heater. Power for rotating the drive shaft and rotor relative to the stator may be provided by an external power source. The hydrodynamic heater may include a controller for controlling operation of the hydrodynamic heater.

BRIEF DESCRIPTION OF THE DRAWINGS

The description herein makes reference to the accompanying drawings wherein like reference numerals refer to like parts throughout the several views, and wherein:

FIG. 3 is a schematic front view of a rotor that partially defines a hydrodynamic chamber of the hydrodynamic heater;

FIG. 4 is a schematic front view of a stator that partially defines the hydrodynamic chamber;

FIG. 5 is a schematic partial view of a stator cavity of the stator;

FIG. 13 is a schematic illustration of an alternately configured heating system employed with the automotive cooling system of FIG. 6, the heating system operating in a semi-dedicated mode;

FIG. 14 is a schematic illustration of the heating system of FIG. 13 operating in a deactivated mode;

FIG. 15 is a schematic illustration of an alternately configured heating system employed with the automotive cooling system of FIG. 6, the heating system operating in a semi-dedicated mode;

FIG. 16 is a schematic illustration of the heating system of FIG. 15 operating in a deactivated mode;

FIG. 17 is a schematic illustration of an alternately configured heating system employed with the automotive cooling system of FIG. 6, the heating system operating in a dedicated mode;

FIG. 18 is a schematic illustration of the heating system of FIG. 17 operating in a semi-dedicated mode;

FIG. 19 is a schematic illustration of an alternately configured heating system employed with the automotive cooling system of FIG. 6, the heating system operating in a dedicated mode;

FIG. 20 is a schematic illustration of the heating system of FIG. 19 operating in a semi-dedicated mode;

DETAILED DESCRIPTION

Figure 1:
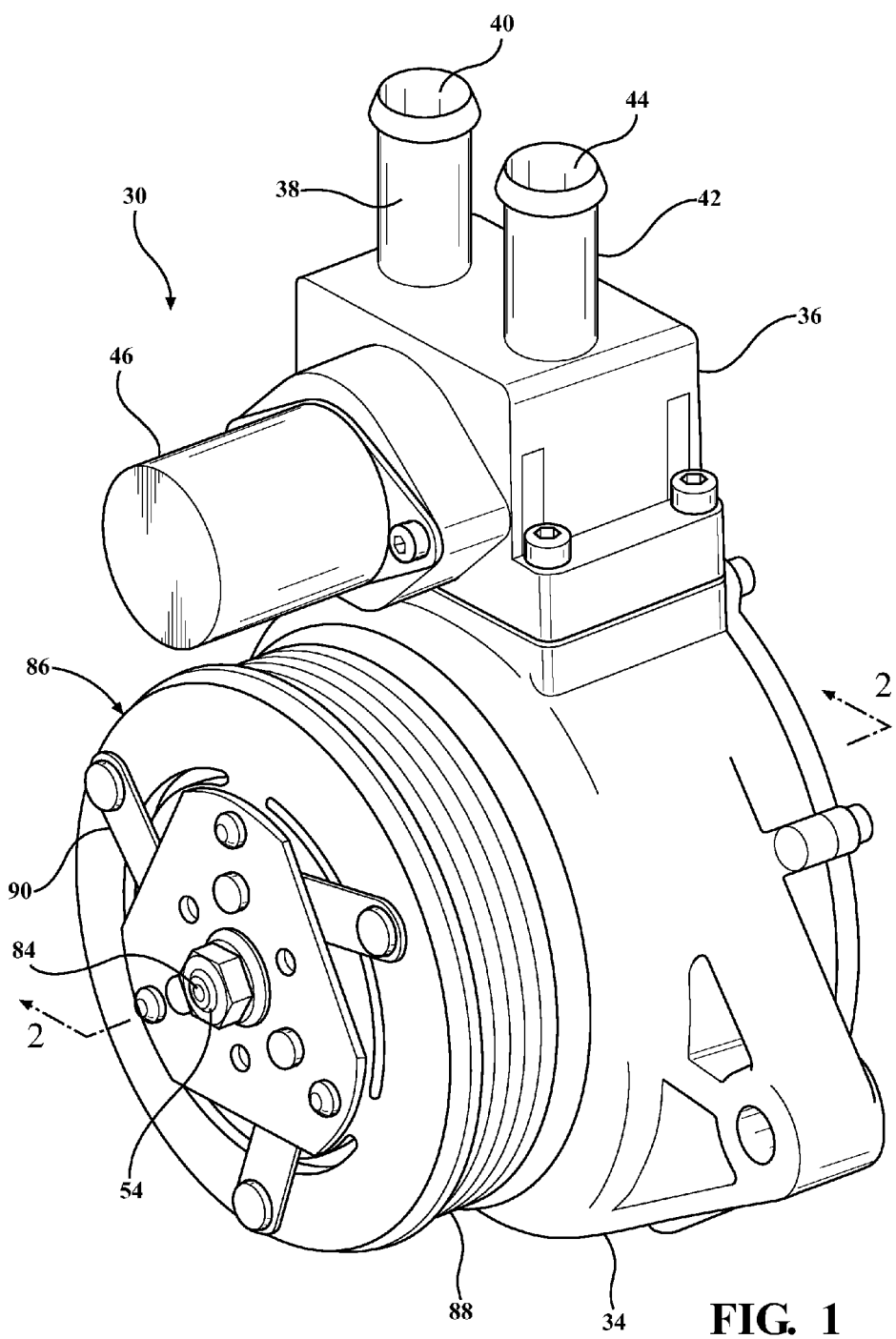
FIG. 1 is a schematic illustration of an exemplary two-port hydrodynamic heater.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Disclosed is a two-port hydrodynamic heater operable to selectively generate a stream of heated fluid. The hydrodynamic heater may be employed with a variety of systems requiring a source of heat. For example, the hydrodynamic heater may be incorporated into an automotive engine cooling system to provide primary or supplemental heat for heating a passenger compartment of a vehicle and/or provide other functions, such as windshield deicing. The hydrodynamic heater may be used in a wide variety of applications that utilize a heat source. Heated fluid discharged from the hydrodynamic heater may be used directly or in conjunction with one or more heat exchangers to provide a stream of heated fluid, such as stream of air. The hydrodynamic heater may function as a primary source of heat or operate to supplement heat provide by another heat source.

Figure 2:
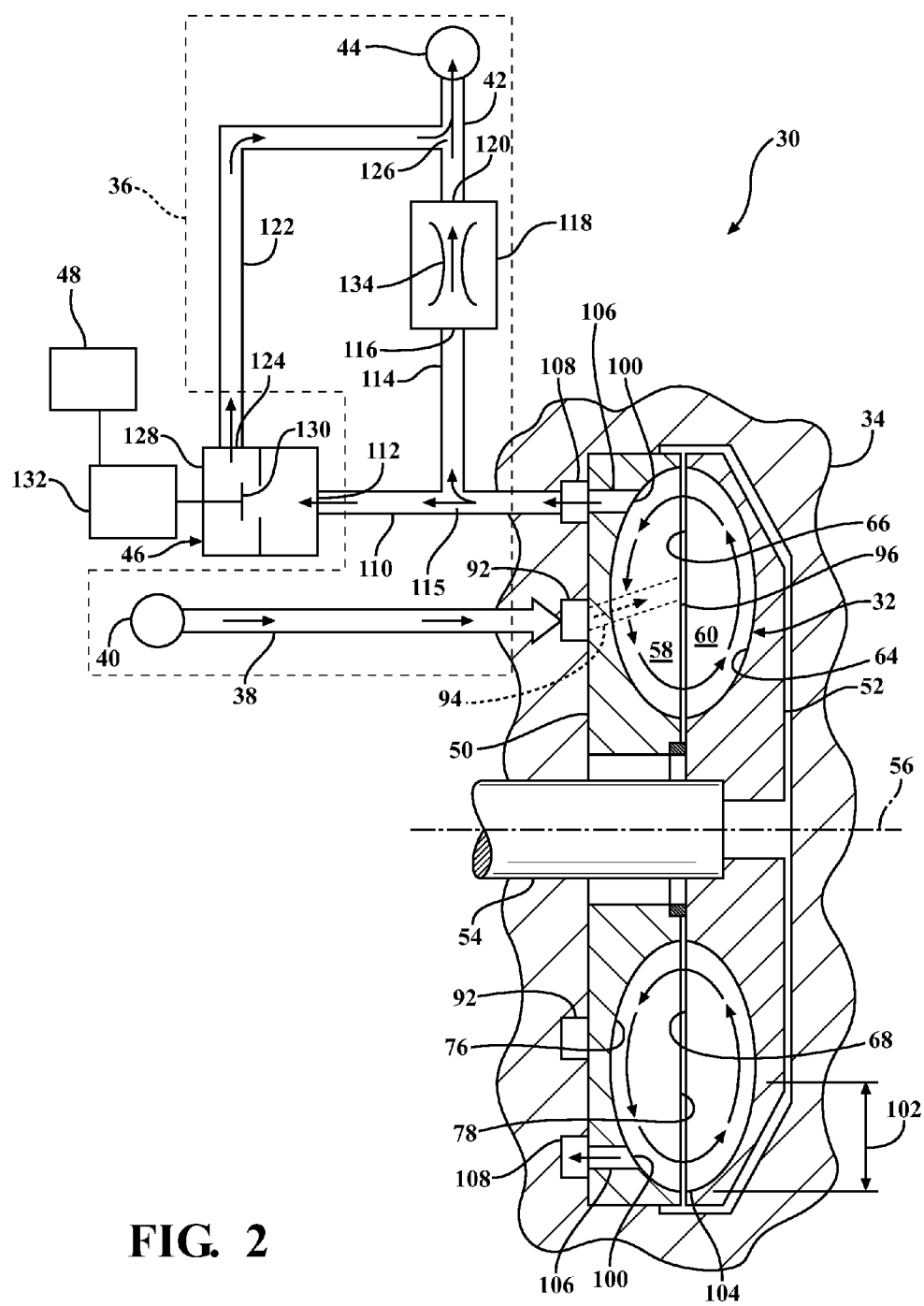
FIG. 2 is schematic partial cross-sectional view of the hydrodynamic heater.

With reference to FIGS. 1 and 2, a two-port hydrodynamic heater 30 may include a generally toroidal-shaped hydrodynamic chamber 32 (see for example, FIGS. 2-5) operable for heating a fluid present within the hydrodynamic chamber. Hydrodynamic chamber 32 may be enclosed within a housing 34. A manifold 36 may be fluidly connected to hydrodynamic chamber 32. Manifold 36 may include an inlet passage 38 having an inlet port 40 and an outlet passage 42 having an outlet port 44. Manifold 36 fluidly connects hydrodynamic chamber 32 to an external fluid source and provides a fluid outlet for outputting a stream of heated fluid generated when operating hydrodynamic heater 30.

Manifold 36 may be attached to housing 34, as illustrated for example in FIG. 1, or alternately arranged separate from housing 34. Additional fluid passages, such as tubes and hoses, may be used to fluidly connect manifold 36 to hydrodynamic chamber 32 when locating manifold 36 remote from housing 34.

A control valve 46 may be employed for controlling a flow of fluid through hydrodynamic heater 30. Hydrodynamic heater 30 may further include a controller 48 for regulating operation of hydrodynamic heater 30 and control valve 46.

With reference to FIGS. 2-4, hydrodynamic chamber 32 may include a stator 50 and a coaxially aligned rotor 52 positioned adjacent stator 50. Stator 50 may be fixedly attached to housing 34. Rotor 52 may be mounted on a drive shaft 54 for concurrent rotation therewith about an axis of rotation 56 relative to the stator 50 and housing 34. Stator 50 and rotor 52 may each include an annular cavity 58 and 60, respectively, which together define hydrodynamic chamber 32.

With reference to FIGS. 2 and 3, rotor 52 may include a plurality of rotor blades 62 arranged circumferentially within annular cavity 60 of rotor 52. Rotor blades 62 extend generally radially outward relative to the axis of rotation 56 and extend axially inward (i.e., toward a center of hydrodynamic chamber 32) from an interior back wall 64 of rotor 52 to a front face 66 of rotor 52 located immediately adjacent stator 50. Each rotor blade 62 includes a leading edge 68 located adjacent stator 50. Rotor blades 62 may be inclined in direction opposite a direction of rotation 70 of rotor 52 from leading edge 68 to interior back wall 64 of rotor 52. Rotor blades 62 and interior back wall 64 together define a plurality of bucket-shaped rotor cavities 72 circumferentially distributed within annular cavity 60 of the rotor 52.

With Reference to FIGS. 2 and 4, stator 50 may include a plurality of stator vanes 74 arranged circumferentially within annular cavity 58 of stator 50. Stator vanes 74 extend generally radially outward relative to the axis of rotation 56 and extend axially inward (i.e., toward a center of hydrodynamic chamber 32) from an interior back wall 76 of the stator 50 to a front face 78 of stator 50 located immediately adjacent rotor 52. Each stator vane 74 includes a leading edge 80 located adjacent rotor 52. Stator vanes 50 may be inclined in the direction of rotation 70 of rotor 50 from leading edge 80 to the interior back wall 76 of stator 50. Stator vanes 74 and the interior back wall 76 of the stator 50 together define a plurality of bucket-shaped stator cavities 82 circumferentially distributed within annular cavity 58 of stator 50.

Power for rotatably driving rotor 52 when hydrodynamic heater 30 is activated may be supplied by an external power source, for example, an internal combustion engine or electric motor. With reference to FIGS. 1 and 2, an end 84 of drive shaft 54 may extend from housing 34 of hydrodynamic heater 30. A drive mechanism 86 may be fixedly attached to end 84 of drive shaft 54 for concurrent rotation therewith. Drive mechanism 86 may include a sheave 88 engageable with the external power source. For example, when employing hydrodynamic heater 30 with an automotive vehicle, sheave 88 may be coupled to an engine accessory drive belt driven by a crankshaft of the vehicle's engine. The accessory drive belt transfers torque generated by the vehicle engine to drive shaft 54 connected to rotor 52.

Drive mechanism 86 may include a clutch 90, such as an electromagnetic clutch, which can be selectively engaged depending on the heating requirements of the system employing hydrodynamic heater 30. Clutch 90 enables rotor 52 to be operably disengaged from the external power source depending on the heating requirements of the system employing hydrodynamic heater 30. This is desirable to minimize the amount of power being drawn from the external power source, which may improve efficiency of the external power source as well as free-up additional power for other purposes. Other alternately configured drive mechanisms for selectively rotating drive shaft 54 and rotor 52 relative to stator 50 may also be employed depending on the design and performance requirements of the particular application.

With continued reference to FIGS. 1, 2 and 4, manifold 36 may include multiple fluid passages for fluidly connecting the inlet and outlet ports 40 and 44 to hydrodynamic chamber 32. Manifold 36 may include, for example, inlet passage 38 fluidly connecting inlet port 44 to a generally annular-shaped inlet plenum 92. One or more stator supply passages 94 extend through stator vane 74 and fluidly connect inlet plenum 92 to hydrodynamic chamber 32. Stator supply passages 94 exit stator vanes 74 at a hydrodynamic chamber inlet port 96 located proximate leading edge 80 of stator vane 74. Hydrodynamic chamber inlet port 96 may be generally located at or near a toroid axis of revolution 98 of the toroidal-shaped hydrodynamic chamber 32. FIG. 4 illustrates each stator vane 74 as including a supply passage 74 and a hydrodynamic chamber inlet port 96; however, certain applications may employ fewer passages and ports. In certain applications some of the stator vanes 74 may include supply passage 94 and hydrodynamic chamber inlet port 96, while other stator vanes 74 will not. The total number of stator supply passages 94 and hydrodynamic chamber inlet ports 96 may vary depending on the design and performance requirements of a particular application.

With reference to FIGS. 2 and 5, hydrodynamic chamber 32 may include a hydrodynamic chamber outlet port 100 located along interior back wall 76 of stator 50. The hydrodynamic chamber outlet port 100 may be positioned within an outermost half 102 of hydrodynamic chamber 32 generally extending from the toroid axis of revolution 98 to an outer circumference 104 of hydrodynamic chamber 32.

With continued reference to FIG. 2, a hydrodynamic chamber outlet passage 106 may fluidly connect the hydrodynamic chamber outlet port 100 to a generally annular-shaped outlet plenum 108. A control valve inlet passage 110 may fluidly connect outlet plenum 108 to an inlet port 112 of control valve 46. A fluid metering device inlet passage 114 may have one end fluidly connected to control valve inlet passage 110 at a first fluid junction 115 and an opposite end fluidly connected to a fluid metering device inlet port 116. Outlet passage 42 of hydrodynamic heater 30 may be fluidly connected to a fluid metering device outlet port 120. A control valve outlet passage 122 may have one end fluidly connected to a control valve outlet port 124 of control valve 46 and an opposite end fluidly connected to outlet passage 42 of hydrodynamic heater 30 at a second fluid junction 126. Control valve 46 and the fluid metering device 118 are fluidly connected in parallel to hydrodynamic chamber outlet port 100 and the outlet port 44 of hydrodynamic heater 30.

Control valve 46 operates in conjunction with fluid metering device 118 to selectively control a flow of fluid from hydrodynamic chamber 32 to outlet port 44 of hydrodynamic heater 30. Control valve 46 may have various configurations, which may include, but are not limited to, mechanical, electro-mechanical, hydraulic and pneumatic actuated devices, as well as other configurations. Control valve 46 may generally include a body 128 housing an adjustable valve member 130 selectively moveable between an open position, in which fluid is allowed to pass through control valve 46, and a closed position substantially blocking the flow of fluid through control valve 46. An actuator 132 operates to selectively move valve member 130 between the open and closed positions.

Control valve 46 operates to selectively control the flow of fluid from hydrodynamic chamber 32 to outlet port 44 of hydrodynamic heater 30. Control valve 46 may be selectively adjusted between the fully closed position, in which control valve 46 substantially blocks fluid from flowing between control valve inlet passage 110 and control valve outlet passage 122, and a fully open position in which fluid is allowed to pass from control valve inlet passage 110 to control valve outlet passage 122. Control valve 46 may be infinitely adjustable between the fully open position and the fully closed position.

Fluid metering device 118 may have any of a variety of configurations. For example, fluid meter device 118 may include a metering orifice 134 having a predetermined configuration selected to suit the design and performance requirements of the particular application. Metering orifice 134 may include a generally fixed fluid thru-flow area that remains open to allow a continuous flow of fluid from fluid metering device inlet port 116 to fluid metering device outlet port 120. Metering orifice 134 may include, for example, an orifice plate or any other device capable of restricting a flow of fluid between fluid metering device inlet passage 114 and outlet passage 42.

Operation of control valve 46 may be controlled by control unit 48. Control unit 48 functions to regulate operation of hydrodynamic chamber 32 and control valve 46. Control unit 48 may include a programmable microprocessor. Control unit 48 may be operably connected to control valve 46. Control unit 48 is capable of sending a control signal to control valve 46 for controlling operation of control valve 46 for purposes of regulating the flow of fluid between control valve inlet passage 110 and control valve outlet passage 122.

Control unit 48 may also function to control operation of clutch 90, which may be operably connected to control unit 48. Control unit 48 may be configured to send a control signal to clutch 90 directing the clutch to engage or disengage depending on the heating requirements of the system in which hydrodynamic heater 30 is employed. Engaging clutch 90 enables torque from the external power supply to be transferred to drive shaft 54, which in turn causes rotor 52 to rotate about the axis of rotation 56 relative to stator 50 and heat fluid present within hydrodynamic chamber 32. Disengaging clutch 90 disconnects drive shaft 54 and rotor 52 from the external power supply to stop rotor 52 from rotating relative to stator 50. With clutch 90 disengaged, hydrodynamic heater 30 ceases producing heat since drive shaft 54 and rotor 52 are no longer rotatably driven by the external power source.

It should be understood that FIG. 2 merely illustrates an example of a fluid passage network that may be used to fluidly interconnect hydrodynamic chamber 32, control valve 46, fluid metering device 118 and inlet and outlet ports 42 and 44. Other alternately configured fluid networks may also be employed depending on the performance and design requirements of a particular application. Various fluid passages and/or combinations of fluid passages may be used to fluidly connect inlet port 42 of the hydrodynamic heater 30 to hydrodynamic chamber inlet port 96. Similarly, various fluid passages and/or combinations of fluid passages may be used to fluidly connect hydrodynamic chamber outlet port 100 to control valve inlet port 112 and fluid metering device inlet port 116, and fluidly connect control valve outlet port 124 and fluid metering device outlet port 120 to outlet port 44 of the hydrodynamic heater 30. Any such alternately configured fluid network may be arranged within one or both manifold 36 and housing 32. Regardless of the actual configuration of the fluid network employed, the fluid network passages should operate to fluidly connect inlet port 40 of hydrodynamic heater 30 to hydrodynamic chamber inlet port 96, hydrodynamic chamber outlet port 100 to inlets ports 112 and 116 of control valve 46 and fluid metering device 118, respectively, and outlet ports 124 and 120 of control valve 46 and fluid metering device 118, respectively, to outlet port 44 of hydrodynamic heater 30. The fluid network employed should be configured with control valve 46 and fluid metering device 118 fluidly connected in parallel to hydrodynamic chamber outlet port 100 and outlet port 44 of hydrodynamic heater 30.

Hydrodynamic heater 30 may be integrated into a selected application by fluidly connecting inlet passage 38 to an external fluid source. Fluid entering hydrodynamic heater 30 from the external fluid source may be heated and discharged from hydrodynamic heater 30 through outlet passage 42. Suitable hoses, pipes, tubes and various other fluid connections may be used to fluidly connect outlet passage 42 to the associated components employed in the particular application.

To initiate operation of hydrodynamic heater 30, control unit 48 may send a control signal to clutch 90 causing the clutch to engage and the rotor 52 to begin rotating. Fluid from the external fluid source may enter hydrodynamic heater 30 at inlet port 40 and travel sequentially through inlet passage 38, inlet plenum 92 and stator supply passage 94 to be discharged into hydrodynamic chamber 32 through hydrodynamic chamber inlet port 96.

Fluid present within hydrodynamic chamber 32 travels along a generally toroidal path in hydrodynamic chamber 32, absorbing heat as the fluid travels back and forth between annular cavities 58 and 60 of stator 50 and rotor 52, respectively. Fluid present in hydrodynamic chamber 32 continues to travel along the path between rotor 52 and stator 50 until being discharged from hydrodynamic chamber 32 through hydrodynamic outlet port 100. The heated fluid passes through hydrodynamic chamber outlet passage 106 to outlet plenum 108.

Heated fluid exits outlet plenum 108 and passes through control valve inlet passage 110, which is fluidly connected to both inlet port 112 of the control valve 46 and inlet port 116 of the fluid metering device 118. Control valve 46 operates to at least partially control the flow of fluid passing through control valve inlet passage 110. Performance of hydrodynamic heater 30 may be at least partially regulated by controlling the flow of fluid being heated in hydrodynamic chamber 32 and discharged through outlet port 44 of hydrodynamic heater 30. This may be accomplished by controlling the flow of fluid passing though control valve 46 from control valve inlet passage 110 to control valve outlet passage 112.

Arranging the control valve 46 in the fully closed position substantially blocks the flow of fluid between control valve inlet passage 110 and control valve outlet passage 122. A quantity of fluid will, however, flow from control valve inlet passage 110 through fluid metering device 118 to outlet port 44, where the heated fluid is discharged from hydrodynamic heater 30. The quantity of fluid passing through fluid metering device 118 may depend in part on the configuration of metering orifice 134 and the pressure drop occurring between fluid metering device inlet port 116 and fluid metering device outlet port 120.

Arranging control valve 46 in a position other than the fully closed position, for example, a position between the fully closed position and the fully open position, allows a portion of the fluid exiting hydrodynamic chamber 32 through hydrodynamic chamber outlet port 100 to flow through control valve outlet passage 122 to outlet port 44 of the hydrodynamic heater 30. The total quantity of fluid passing through hydrodynamic chamber 32 substantially corresponds to a sum total of fluid passing through fluid metering device 118 and control valve 46

With hydrodynamic heater 30 deactivated (i.e., rotor 52 not rotating and positioned stationary relative to stator 50) a quantity of fluid may continue to pass through hydrodynamic heater 30 from inlet port 40 to outlet port 44. This is due to the open flow path through fluid metering device 118. With control valve 46 fully closed a quantity of fluid may continue to flow through fluid metering device 118 from the inlet port 40 to the outlet port 44. The quantity of fluid flowing through hydrodynamic heater 30 when deactivate will depend in part on the pressure drop occurring between inlet port 40 and outlet port 44, which may be at least partially dependent on the configuration of the application in which hydrodynamic heater 30 is employed.

Figure 6:
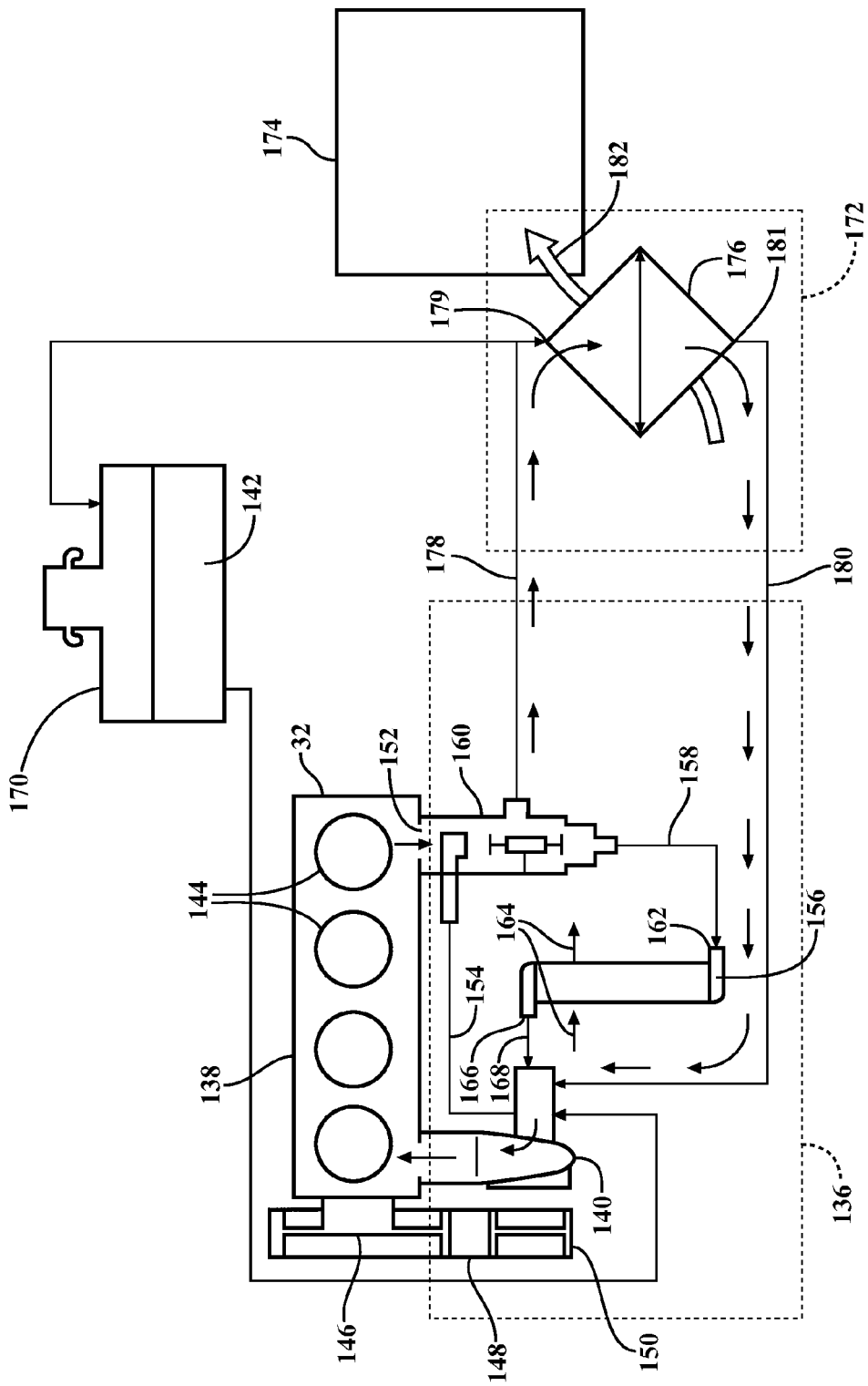
FIG. 6 is a schematic illustration of an automotive engine cooling system.

Hydrodynamic heater 30 may be employed in a wide variety of applications to provide a supply of heat required for the particular application. For example, hydrodynamic heater 30 may be incorporated with an automotive vehicle cooling system to provide heat for warming a passenger compartment of the vehicle and to provide other capabilities, such as window deicing and engine cooling. An example of a typical automotive cooling system 136 is schematically illustrated in FIG. 6. Vehicle cooling system 136 functions to regulate an operating temperature of an engine 138. Cooling system 136 may include a water pump 140 operable to circulate a cooling fluid 142 through engine 138 to absorb excess heat produced by engine 138. The excess heat is a byproduct of combusting a mixture of fuel and air in cylinders 144 of engine 138 to produce usable mechanical work for propelling the vehicle. Water pump 140 may be powered by an engine accessory drive 146 by way of a drive belt 148 that engages a sheave 150 attached to water pump 140. Accessory drive 146 may be connected to a crankshaft (not shown) of engine 138. The cooling fluid 142 may be circulated through passages in engine 138 where the cooling fluid 142 absorbs at least some of the excess heat. After circulating through engine 138, the cooling fluid 142 may be discharged from engine 138 through an exit passage 152. Depending on the temperature of the cooling fluid 142 exiting engine 138, the cooling fluid may be directed back to water pump 140 through a bypass line 154 to be recirculated through engine 138, or may be directed to a radiator 156 through a fluid line 158.

A thermostat 160 operates to control distribution of the cooling fluid 142 between bypass line 154 and fluid line 158. Thermostat 160 may be configured as a thermally activated valve capable of automatically adjusting its thru-flow area depending on a temperature of the cooling fluid 142 discharged from engine 138 through exit passage 152. An automotive thermostat is one example of thermally activate valve. Automotive thermostats may be calibrated to begin opening at a predetermined cooling fluid temperature (measured within thermostat 160), for example 190 degree Fahrenheit. At cooling fluid temperatures below the calibrated temperature, thermostat 160 may be fully closed to prevent cooling fluid from being supplied to radiator 156 through fluid line 158. At temperatures at or slightly above the calibrated temperature, thermostat 160 begins opening to allow a portion of cooling fluid 142 from engine 138 to be directed to radiator 156. At cooling fluid temperatures significantly higher than the calibrated temperature, thermostat 160 will be completely open so as to maximize the flow rate of cooling fluid 142 to radiator 156 for a particular vehicle operating condition.

Cooling fluid 142 passing through fluid line 158 enters radiator 156 through an inlet port 162. Cooling fluid 142 flows through radiator 156 where the fluid rejects a portion of its heat to a stream of ambient air 164 flowing across radiator 156. Cooling fluid 142 exits radiator 156 through an outlet port 166 at a lower temperature than the temperature of the cooling fluid entering radiator 156 at inlet port 162. Upon exiting radiator 156 at outlet port 166, cooling fluid 142 is directed to water pump 140 through a fluid line 168.

An expansion tank 170 may be fluidly connected to water pump 140. Expansion tank 170 provides a reservoir for capturing cooling fluid 142 discharged from cooling system 136 as the cooling fluid is heated, such as may occur when engine 138 is started after being turned off for a period of time. A portion of the excess cooling fluid 142 may also be withdrawn from expansion tank 170 and returned back to cooling system 136 when the temperature of the cooling fluid within cooling system 136 is decreased, such as may occur after engine 138 is turned off.

Conventional automotive vehicles may include a heating system 172 for providing a supply of warm air to heat a passenger compartment 174 of the vehicle. Heating system 172 may include a heat exchanger 176, also known as a heater core, fluidly connected to cooling system 136 through an inlet heater hose 178 and exit heater hose 180. Inlet heater hose 178 may be fluidly connected to cooling system 136 through thermostat 160 and to heat exchanger 176 at in inlet port 179. Exit heater hose 180 may be fluidly connected to an outlet port 181 of heat exchanger 176 and to water pump 140. A portion of cooling fluid 142 exiting engine 138 at exit passage 152 passes through inlet heater hose 178 to heat exchanger 176. Cooling fluid 142 rejects a portion of its heat to a stream of air 182 made to flow over heat exchanger 176. Airstream 182 may include air drawn from outside the vehicle, from the passenger compartment 174 of the vehicle, or a combination thereof. Airstream 182 exits heat exchanger 176 at a higher temperature than when it entered. The warm airstream 182 may be discharged into passenger compartment 174 to warm the interior of the vehicle. The warm airstream 182 may also be directed to flow over an interior glass surface of the vehicle to remove frost or condensation that may have formed on the glass surface. Heating system 172 may also include various control devices for regulating a temperature and flow rate of airstream 182 being supplied to passenger compartment 174.

FIGS. 7-20 schematically illustrate various alternate schemes for integrating hydrodynamic heater 30 with engine cooling system 136 to provide heated fluid to heat exchanger 176 for supplying warm air to passenger compartment 174. It shall be appreciated that these alternate schemes illustrate only a few examples of alternative ways in which hydrodynamic heater 30 may be integrated within a particular application. It shall be appreciated that hydrodynamic heater 30 is not limited to automotive applications and may be employed in a wide variety of other applications requiring a source of heat.

Figure 7:
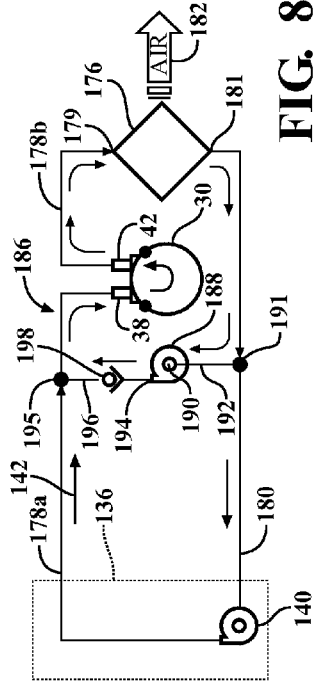
FIG. 7 is a schematic illustration of a heating system incorporating the hydrodynamic heater, employed with the automotive cooling system of FIG. 6.

Referring to FIG. 7, a heating system 184 may include hydrodynamic heater 30 fluidly connected in series with the heat exchanger 176. With this arrangement all the cooling fluid 142 received from cooling system 136 passes through hydrodynamic heater 30 prior to being delivered to heat exchanger 176. An inlet hose 178a fluidly connects the vehicle cooling system 136 and water pump 140 to inlet passage 38 of the hydrodynamic heater 30. An outlet hose 178b fluidly connects outlet passage 42 of hydrodynamic heater 30 to inlet port 179 of heat exchanger 176. Outlet port 181 of heat exchanger 176 may be fluidly connected to vehicle cooling system 136 and water pump 140 through exit heater hose 180. Vehicle water pump 140 may be used to supply pressurized cooling fluid 142 to hydrodynamic heater 30 to maintain the fluid level within the hydrodynamic heater 30 at desired level.

Activating hydrodynamic heater 30 (i.e., causing rotor 52 to rotate relative to stator 50) causes pressurized cooling fluid 142 from water pump 140 of vehicle cooling system 136 to enter hydrodynamic heater 30 through inlet passage 38. The cooling fluid 142 is heated by hydrodynamic heater 30 in the manner previously described and discharged through outlet passage 42 to outlet hose 178b. The heated cooling fluid 142 may be delivered to heat exchanger 176 at inlet port 179. Heat from the cooling fluid 142 is transferred to airstream 182 as the cooling fluid 142 passes through the heat exchanger. The cooling fluid 142 is discharged from outlet port 181 of the heat exchanger 176 into exit heater hose 180 and returned to the vehicle cooling system 136 and water pump 140.

Generally, a small quantity of fluid may continue to flow through hydrodynamic heater 30 through the opening in the fluid metering device 118 when hydrodynamic heater 30 is deactivated (i.e., rotor 152 is stationary and not rotating relative to stator 150). The magnitude of flow will depend in part on the pressure drop occurring across hydrodynamic heater 30 between inlet passage 38 and outlet passage 42.

Figure 8:
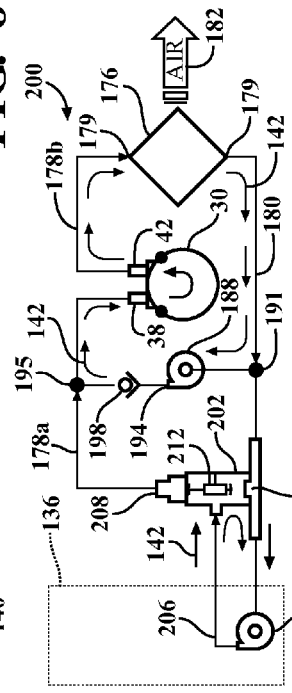
FIG. 8 is a schematic illustration of an alternately configured heating system employed with the automotive cooling system of FIG. 6.

With reference to FIG. 8, an alternately configured heating system 186 may include hydrodynamic heater 30 fluidly connected in series with the heat exchanger 176. Inlet hose 178a may fluidly connect the vehicle cooling system 136 and water pump 140 to inlet passage 38 of the hydrodynamic heater 30, and outlet hose 178b may fluidly connect outlet passage 42 of hydrodynamic heater 30 to inlet port 179 of heat exchanger 176. Outlet port 181 of heat exchanger 176 may be fluidly connected to vehicle cooling system 136 and water pump 140 through exit heater hose 180.

Heating system 186 may include a fluid pump 188 having an inlet port 190 fluidly connected to exit heater hose 180 at a fluid junction 191 through a pump supply hose 192. An outlet port 194 of fluid pump 188 may be fluidly connected to inlet hose 178a at fluid junction 195 by way of a pump discharge hose 196. Pump discharge hose 196 may include a check valve 198 fluidly connected between outlet port 194 of fluid pump 188 and fluid junction 195. Check valve 198 may be configured to allow cooling fluid 142 to flow from fluid pump 188 to inlet hose 178a, while substantially blocking a flow of fluid in an opposite direction from inlet hose 178a to fluid pump 188. Check valve 198 may not be required when fluid pump 188 is configured to substantially block cooling fluid 142 from flowing through fluid pump 188 from fluid junction 195 to fluid junction 191 when fluid pump 188 is turned off and not operating.

Fluid pump 188 may be used in conjunction with water pump 140 to supply a stream of pressurized cooling fluid 142 to the hydrodynamic heater 30 to maintain the fluid level in hydrodynamic heater 30 at a desired level. Fluid pump 188 and water pump 140 may be similarly configured with similar operating and performance characteristics, or may each have a different configuration with different operating and performance characteristics.

Heating system 186 may be operated in a semi-dedicated mode, in which at least a portion of the cooling fluid 142 discharged from heat exchanger 176 is recirculated back to hydrodynamic heater 30 through fluid pump 188 and bypasses vehicle cooling system 136. Heating system 186 may also be operated in a non-dedicated mode, in which substantially all the cooling fluid 142 discharged from heat exchanger 176 is returned to vehicle cooling system 136 and water pump 140 prior to being directed back to hydrodynamic heater 30 through inlet hose 178a. Operating heating system 186 in the semi-dedicated mode may provide quicker heating of the cooling fluid 142 delivered to heat exchanger 176, particularly when operating heating system 186 following a cold start of engine 138 (see FIG. 6). Heating system 186 operates in a similar manner as heating system 184 (see FIG. 7) when heating system 186 is operated in the non-dedicated mode.

Water pump 140 and fluid pump 188 both operate to produce a stream of pressurized cooling fluid 142 when operating heating system 186 in the semi-dedicated mode. Activating hydrodynamic heater 30 (i.e., causing rotor 52 to rotate relative to stator 50) causes pressurized cooling fluid 142 from water pump 140 to pass through inlet hose 178a. Pressurized cooling fluid 142 discharged from fluid pump 188 mixes with the cooling fluid 142 from water pump 140 at fluid junction 195 and is delivered to hydrodynamic heater 30 through inlet passage 38. Hydrodynamic heater 30 heats the fluid in the previously describe manner. The heated cooling fluid 142 passes through outlet hose 178b and enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of heat exchanger 176 into exit heater hose 180. At fluid junction 191 a portion of the cooling fluid 142 is recirculated back to fluid pump 188 where it is pressurized and the remaining fluid is returned to vehicle cooling system 136 and water pump 140 through exit heater hose 180. Cooling fluid 142 discharged from fluid pump 188 passes through check valve 198 and mixes with cooling fluid 142 from engine cooling system 136 a fluid junction 195 to be delivered back to hydrodynamic heater 30.

The non-dedicated mode may be initiated by activating the hydrodynamic heater 30 (i.e., causing rotor 52 to rotate relative to stator 50), which causes pressurized cooling fluid 142 from the water pump 140 of vehicle cooling system 136 to enter hydrodynamic heater 30 through inlet passage 38. Fluid pump 188 is not operating when heating system 186 is operating in the non-dedicated mode. The cooling fluid 142 from vehicle cooling system 136 is heated by hydrodynamic heater 30 in the manner previously described and discharged through outlet passage 42 to outlet hose 178b. The heated cooling fluid 142 is delivered to heat exchanger 176 at inlet port 179. Heat from the cooling fluid 142 is transferred to airstream 182 as the cooling fluid flows through heat exchanger 176. The cooling fluid 142 is discharged from outlet port 181 of heat exchanger 176 into exit heater hose 180 and returned to the vehicle cooling system 136 and water pump 140. Only a small amount of cooling fluid 142, if any, flows through fluid pump 188 and check valve 198 from fluid junction 191 to fluid junction 195 when heating system 186 is operated in the non-dedicated mode.

Figure 9:
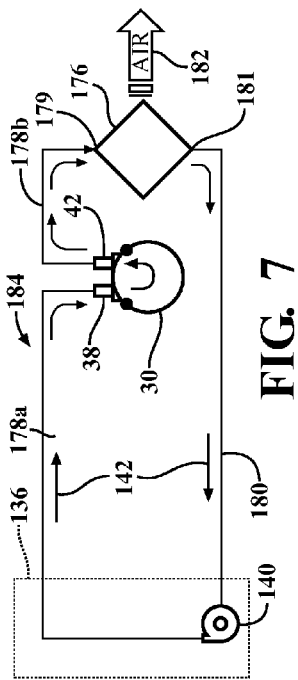
FIG. 9 is a schematic illustration of an alternately configured heating system employed with the automotive cooling system of FIG. 6, the heating system operating in a semi-dedicated mode.
Figure 10:
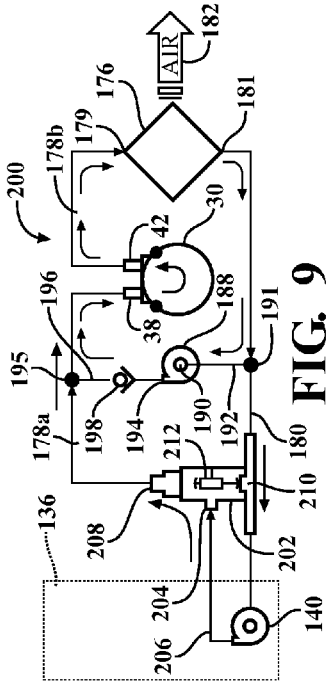
FIG. 10 is a schematic illustration of the heating system of FIG. 9 operating in a dedicated mode.

With reference to FIGS. 9 and 10, an alternately configured heating system 200 may include hydrodynamic heater 30 fluidly connected in series with the heat exchanger 176. Heating system 200 may include a thermally actuated valve 202 for controlling a flow of cooling fluid 142 from vehicle cooling system 136 to heating system 200. Thermally actuated valve 202 may have any of a variety of configurations, and may include mechanical, electro-mechanical, hydraulic and pneumatic actuated devices. An inlet port 204 of thermally actuated valve 202 may be fluidly connected to water pump 140 of vehicle cooling system 136 through a supply passage 206. A first outlet port 208 of thermally actuated valve 202 may be fluidly connected to inlet hose 178a, which in turn may be fluidly connected to inlet passage 38 of hydrodynamic heater 30. Outlet hose 178b may fluidly connect outlet passage 42 of hydrodynamic heater 30 to inlet port 179 of heat exchanger 176. The outlet port 181 of heat exchanger 176 may be fluidly connected to vehicle cooling system 136 and water pump 140 through exit heater hose 180. The thermally actuated valve 202 may be fluidly connected to exit heater hose 180 at a second outlet port 210.

Heating system 200 may include fluid pump 188 with its inlet port 190 fluidly connected to exit heater hose 180 at fluid junction 191 through pump supply hose 192. Outlet port 194 of fluid pump 188 may be fluidly connected to inlet hose 178a at fluid junction 195 through pump discharge hose 196. Pump discharge hose 196 may include check valve 198 fluidly connected between outlet port 194 of fluid pump 188 and fluid junction 195. Check valve 198 may be configured to allow cooling fluid 142 to flow from fluid pump 188 to the inlet hose 178a, while substantially blocking the flow of fluid in an opposite direction from the inlet hose 178a to the fluid pump 188. Check valve 198 may not be required if fluid pump 188 is configured to substantially block cooling fluid 142 from flowing through fluid pump 188 from fluid junction 195 to fluid junction 191 when fluid pump 188 is turned off and not operating. Fluid pump 188 may be used independently or in conjunction with water pump 140 to supply a stream of pressurized fluid to hydrodynamic heater 30.

Heating system 200 may be operated in a semi-dedicated mode (as illustrated, for example, in FIG. 9), in which at least a portion of the cooling fluid 142 discharged from heat exchanger 176 is recirculated back to hydrodynamic heater 30 through fluid pump 188 and bypasses vehicle cooling system 136. Heating system 200 may also be operated in a fully dedicated mode (as illustrated, for example, in FIG. 10), in which substantially all the cooling fluid 142 discharged from heat exchanger 176 passes through fluid pump 188 and is returned to hydrodynamic heater 30. Operating heating system 186 in the semi-dedicated mode may provide quicker heating of the cooling fluid delivered to heat exchanger 176, particularly when operating heating system 200 immediately following a cold start of engine 138 (see FIG. 6).

Thermally actuated valve 202 operates in response to a temperature of cooling fluid 142 entering the valve through inlet port 204 to distribute the cooling fluid 142 received from vehicle cooling system 136 and water pump 140 between inlet hose 178a and exit heater hose 180. The thermally actuated control valve 202 may include an adjustable valve member 212 that operates to open and close the first and second outlet ports 208 and 210, respectively, of thermally actuated valve 202 based on the temperature of the cooling fluid 142 delivered to the valve through supply passage 206. Thermally actuated valve 202 may be infinitely adjustable between the fully dedicated position, in which the valve member 212 is positioned to substantially close first outlet port 208 and to open the second outlet port 210, and the semi-dedicated position, in which the valve member 212 is positioned to open first outlet port 208 and substantially close second outlet port 210. FIG. 10 schematically illustrates heating system 200 operating in the fully dedicated mode. FIG. 9 schematically illustrates heating system 200 operating in the semi-dedicated mode. Heating system 200 operates in the semi-dedicated mode whenever valve member 212 is arranged in a position other than with first outlet port 208 fully closed.

Referring to FIG. 9, with the valve member 212 arranged in the semi-dedicated position, such that the first outlet port 208 is open and the second outlet port 210 is substantially closed, cooling fluid 142 from vehicle cooling system 136 and water pump 140 is allowed to flow from supply passage 206 to inlet hose 178a, and is substantially blocked from flowing directly to exit heater hose 180 through outlet passage 210 without first passing through hydrodynamic heater 30. When operating heating system 200 in the semi-dedicated mode, water pump 140 and fluid pump 188 may be operated concurrently to produce a stream of pressurized fluid for delivery to hydrodynamic heater 30. Activating hydrodynamic heater 30 (i.e., causing rotor 52 to rotate relative to stator 50) causes pressurized cooling fluid 142 from water pump 140 to pass through inlet hose 178a. Pressurized fluid discharged from fluid pump 188 mixes with the cooling fluid 142 from water pump 140 at fluid junction 195 and is delivered to hydrodynamic heater 30 through inlet passage 38. Hydrodynamic heater 30 heats the fluid in the previously describe manner. The heated cooling fluid 142 passes through outlet hose 178b and enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into exit heater hose 180. At fluid junction 191 a portion of the cooling fluid 142 is recirculated back through fluid pump 188 where it is pressurized and the remaining fluid is returned to vehicle cooling system 136 and water pump 140 through exit heater hose 180. Pressurized cooling fluid 142 discharged from fluid pump 188 passes through check valve 198 and mixes with cooling fluid 142 from engine cooling system 136 at fluid junction 195 to be returned to hydrodynamic heater 30.

Heating system 200 may also be operated in the semi-dedicated mode when the valve member 212 of thermally actuated valve 200 is arranged such that both the first and second outlet ports 208 and 210 of thermally actuated valve 202 are at least partially open. Thermally actuated valve 202 operates to direct a portion of the cooling fluid 142 received from supply passage 206 to inlet hose 178a and the remaining portion of the fluid to the exit heater hose 180 through the second outlet port 210.

Referring to FIG. 10, with the valve member 212 arranged in the dedicated position, such that first outlet port 208 is substantially closed and second outlet port 210 is open, thermally actuated valve 202 operates to direct substantially all the cooling fluid 142 from supply passage 206 back to vehicle cooling system 136 and water pump 140. The cooling fluid 142 from supply passaged 206 passes through second outlet port 210 (which fluidly connects the thermally actuated valve 202 to exit heater hose 180) to exit heater hose 180 and is returned to vehicle cooling system 136 and water pump 140 without passing through hydrodynamic heater 30.

When operating heating system 200 in the dedicated mode, fluid pump 188 may operate to produce a stream of pressurized fluid for delivery to hydrodynamic heater 30. Water pump 140 may or may not be operating. Activating hydrodynamic heater 30 (i.e., causing rotor 52 to rotate relative to stator 50) causes pressurized cooling fluid 142 from fluid pump 188 to pass through inlet hose 178a. Pressurized cooling fluid 142 discharged from fluid pump 188 enters inlet hose 178a at fluid junction 195 and is delivered to hydrodynamic heater 30 through inlet passage 38. Hydrodynamic heater 30 heats the fluid in the previously describe manner. The heated cooling fluid 142 passes through outlet hose 178b and enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into exit heater hose 180. At fluid junction 191 substantially all the cooling fluid 142 discharged from heat exchanger 176 is recirculated back to fluid pump 188 where it is pressurized. Pressurized cooling fluid 142 discharged from fluid pump 188 passes through check valve 198 and is returned to hydrodynamic heater 30 through inlet hose 178a.

Figure 11:
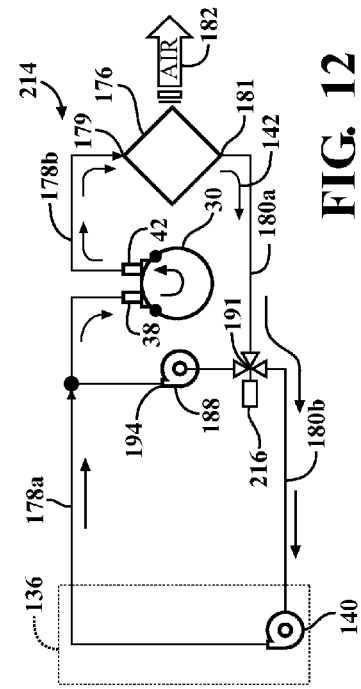
FIG. 11 is a schematic illustration of an alternately configured heating system employed with the automotive cooling system of FIG. 6, the heating system operating in a dedicated mode.
Figure 12:
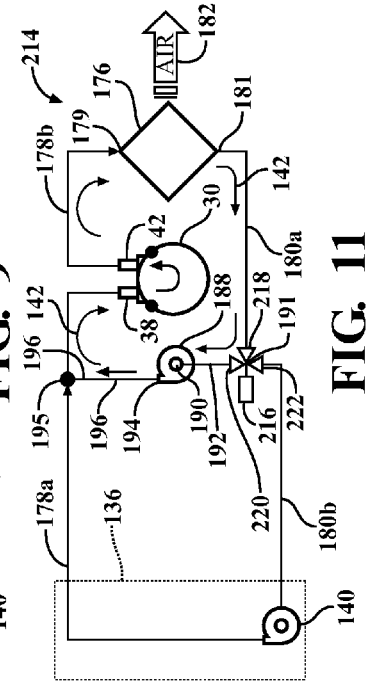
FIG. 12 is a schematic illustration of the heating system of FIG. 11 operating in a semi-dedicated mode.

With reference to FIGS. 11 and 12, an alternately configured heating system 214 may include hydrodynamic heater 30 fluidly connected in series with heat exchanger 176. Inlet hose 178a may fluidly connect vehicle cooling system 136 and water pump 140 to inlet passage 38 of the hydrodynamic heater 30, and outlet hose 178b may fluidly connect outlet passage 42 of hydrodynamic heater 30 to inlet port 179 of heat exchanger 176. Outlet port 181 of heat exchanger 176 may be fluidly connected to a first exit heater hose 180a.

Heating system 214 may include a control valve 216 for controlling distribution of the cooling fluid 142 discharged from heat exchanger 176. Control valve 216 enables heating system 214 to operate in a fully dedicated mode. Control valve 216 may include an inlet port 218 fluidly connected to first exit heater hose 180a. A first outlet port 220 of control valve 216 may be fluidly connected to inlet port 190 of fluid pump 188 through pump supply hose 192. A second outlet port 222 of the control valve 216 may be fluidly connected to vehicle cooling system 136 and water pump 140 through a second exit heater hose 180b. Control valve 216 may have any of a variety of configurations, which may include for example, mechanical, electro-mechanical, hydraulic and pneumatic actuated devices. Control valve 216 may be selectively adjustable to control distribution of the cooling fluid 142 discharged from heat exchanger 176 between the first and second outlet ports 220 and 222 of control valve 216. Control valve 216 may be selectively adjusted between discrete positions to control the flow of fluid between inlet port 190 and outlet ports 220 and 222, or may be infinitely variable. Operation of control valve 216 may be controlled by a separate controller, such as, for example, control unit 48 (see FIG. 2) used to control operation of hydrodynamic heater 30.

Outlet port 194 of fluid pump 188 may be fluidly connected to inlet hose 178a at fluid junction 195 through discharge hose 196. Fluid pump 188 may be used independent of and/or in conjunction with vehicle water pump 140 to supply a stream of pressurized cooling fluid 142 to hydrodynamic heater 30 to maintain the fluid level in hydrodynamic heater 30 at a desired level.

Heating system 214 may be operated in a non-dedicated mode (as illustrated, for example, in FIG. 12), in which substantially all the cooling fluid 142 discharged from heat exchanger 176 is returned to vehicle cooling system 136 and water pump 140 and bypasses fluid pump 188. Heating system 214 may also be operated in a fully dedicated mode (as illustrated, for example, in FIG. 11), in which substantially all the cooling fluid 142 discharged from heat exchanger 176 is returned to hydrodynamic heater 30 through fluid pump 188 and bypasses engine cooling system 136. Operating heating system 214 in the dedicated mode may provide quicker heating of the cooling fluid 142 delivered to heat exchanger 176, particularly when operating heating system 214 immediately following a cold start of engine 138 (see FIG. 6). Heating system 214 may also be operated in semi-dedicated mode, in which a portion of the cooling fluid 142 discharged from heat exchanger 176 is recirculated back to hydrodynamic heater 30 through fluid pump 188 and a portion of the cooling fluid 142 is returned to vehicle cooling system 136 and water pump 142 through second exit heater hose 180b.

Control valve 216 operates to control distribution of cooling fluid 142 discharged from heat exchanger 176 between pump supply hose 192 and second exit heater hose 180b. Control valve 216 operates to open and close the first and second outlet ports 220 and 222, respectively, of control valve 216. Control valve 216 may be infinitely adjustable between a fully dedicated position (FIG. 11) and a non-dedicated position (FIG. 12). Heating system 214 operates in the semi-dedicated mode when control valve 216 is adjusted between the fully dedicated position and the non-dedicated position. Adjusting control valve 216 to the fully dedicated position substantially closes second outlet port 222 to prevent cooling fluid 142 from returning to vehicle cooling system 136 and pump 140 through second exit heater hose 180a, and opens first outlet port 220 to allow cooling fluid 142 from heat exchanger 176 to flow through fluid pump 188 and be recirculated back to hydrodynamic heater 30.

FIG. 12 schematically illustrates heating system 214 operating in the non-dedicated mode. Adjusting control valve 216 to the non-dedicated position opens second outlet port 222 to allow cooling fluid 142 to return to vehicle cooling system 136 and pump 140 through second exit heater hose 180a, and substantially closes first outlet port 220 to substantially block cooling fluid 142 from passing through fluid pump 188 and being recirculated back to hydrodynamic heater 30.

FIG. 11 schematically illustrates heating system 214 operating in the dedicated mode. Adjusting control valve 216 to the dedicated position opens first outlet port 220 to allow cooling fluid 142 to be recirculated back to hydrodynamic heater 30 through fluid pump 188 and bypass vehicle cooling system 136, and substantially closes second outlet port 222 to substantially block cooling fluid 142 from passing through second heater hose 180b to vehicle cooling system.

With the control valve 216 adjusted to the semi-dedicated position, both the first and second outlet port 220 and 222 are open, thereby allowing cooling fluid 142 discharged from heat exchanger 176 to be returned to vehicle cooling system 136 through second exit heater hose 180b, and to be recirculated back to hydrodynamic heater 30 through fluid pump 188.

With reference to FIG. 11, when operating heating system 214 in the dedicated mode, fluid pump 188 may be operated to produce a stream of pressurized fluid for delivery to hydrodynamic heater 30. Vehicle pump 140 may or may not be operating. Activating hydrodynamic heater 30 (i.e., causing rotor 52 to rotate relative to stator 50) causes pressurized cooling fluid 142 from fluid pump 188 to pass through inlet hose 178a. Pressurized cooling fluid 142 discharged from fluid pump 188 enters inlet hose 178a at fluid junction 195 and is delivered to hydrodynamic heater 30 through inlet passage 38. Hydrodynamic heater 30 heats the fluid in the previously describe manner. The heated cooling fluid 142 passes through outlet hose 178b and enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into first exit heater hose 180a. At fluid junction 191 the cooling fluid 142 is recirculated back to fluid pump 188 where it is pressurized. Cooling fluid 142 is prevented from flowing to second exit heater hose 180b by control valve 216. Pressurized cooling fluid 142 discharged from fluid pump 188 is returned to hydrodynamic heater 30 through inlet hose 178a.

With reference to FIG. 12, when operating heating system 214 in the non-dedicated mode, water pump 140 may be operated to produce a stream of pressurized fluid for delivery to hydrodynamic heater 30. Fluid pump 188 may be deactivated when operating heating system 214 in the non-dedicated mode. Activating hydrodynamic heater 30 (i.e., causing rotor 52 to rotate relative to stator 50) causes pressurized cooling fluid 142 from water pump 140 to pass through inlet hose 178a. Pressurized cooling fluid 142 from water pump 140 is delivered to hydrodynamic heater 30 through inlet passage 38. Hydrodynamic heater 30 heats the fluid in the previously describe manner. The heated cooling fluid 142 passes through outlet hose 178b and enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into exit first heater hose 180a. At fluid junction 191 the cooling fluid 142 is returned to the vehicle cooling system 136 through second exit heater hose 180b. Cooling fluid 142 is prevented from flowing to fluid pump 188 by control valve 216.

When operating heating system 214 in the semi-dedicated mode, water pump 140 and fluid pump 188 may be operated to produce a stream of pressurized fluid for delivery to hydrodynamic heater 30. Activating hydrodynamic heater 30 (i.e., causing rotor 52 to rotate relative to stator 50) causes pressurized cooling fluid 142 from water pump 140 to pass through inlet hose 178a and combine with pressurized cooling fluid 142 from fluid pump 188 at fluid junction 195. Pressurized cooling fluid 142 from water pump 140 and fluid pump 188 is delivered to hydrodynamic heater 30 through inlet passage 38. Hydrodynamic heater 30 heats the fluid in the previously describe manner. The heated cooling fluid 142 is discharged from hydrodynamic heater 30 through outlet passage 42 and passes through outlet hose 178b to inlet port 179 of heat exchanger 176. Heat from the cooling fluid 142 is transferred to airstream 182 as the cooling fluid 142 flows through heat exchanger 176. The cooling fluid 142 is discharged from outlet port 181 of the heat exchanger 176 into exit first heater hose 180a. At fluid junction 191 a portion of the cooling fluid 142 is returned to the vehicle cooling system 136 through second exit heater hose 180b and a portion of the cooling fluid 142 is recirculated back to hydrodynamic heater 30 through fluid pump 188.

With reference to FIGS. 13 and 14, an alternately configured heating system 224 may include hydrodynamic heater 30 fluidly connected in parallel with the heat exchanger 176. Inlet heater hose 178 may fluidly connect vehicle cooling system 136 and water pump 140 to inlet 179 of heat exchanger 176. Exit heater hose 180 fluidly connects heat exchanger outlet port 181 to vehicle cooling system 136 and water pump 140. Inlet passage 38 of hydrodynamic heater 30 may be fluidly connected to exit heater hose 180 at a fluid junction 226 through an inlet hose 228. Outlet passage 42 of hydrodynamic heater 30 may be fluidly connected to inlet heater hose 178 at fluid junction 230 through an outlet heater hose 232. Inlet hose 228 may include check valve 198 fluidly connected to fluid junction 226 and inlet passage 38 of hydrodynamic heater 30. Check valve 198 may be configured to allow cooling fluid 142 to flow from fluid junction 226 to hydrodynamic heater 30, while substantially blocking a flow of fooling fluid 142 in an opposite direction from hydrodynamic heater 30 to fluid junction 226.

Heating system 224 may be operated in a semi-dedicated mode, in which at least a portion of the cooling fluid 142 discharged from heat exchanger 176 is recirculated back to hydrodynamic heater 30 and bypasses vehicle cooling system 136. FIG. 13 schematically illustrates heating system 224 operating in the semi-dedicated mode. FIG. 14 schematically illustrates heating system 224 operating with hydrodynamic heater 30 deactivated.

With reference to FIG. 13, when operating heating system 224 in the semi-dedicated mode, activating hydrodynamic heater 30 (i.e., causing rotor 52 to rotate relative to stator 50) causes pressurized cooling fluid 142 from water pump 140 to pass through inlet heater hose 178. Heated fluid discharged from hydrodynamic heater 30 through outlet passage 42 mixes with the cooling fluid 142 from water pump 140 at fluid junction 230 and travels through inlet heater hose 178 to heat exchanger 176. The heated cooling fluid 142 enters heat exchanger 176 through inlet port 179. Heat from the cooling fluid 142 may be transferred to airstream 182 as the cooling fluid 142 flows through heat exchanger 176. The cooling fluid 142 is discharged from outlet port 181 of heat exchanger 176 into exit heater hose 180. At fluid junction 226 a portion of the cooling fluid 142 is recirculated through inlet hose 228 and check valve 198 back to hydrodynamic heater 30 where it is heated and directed back to heat exchanger 176. The portion of cooling fluid 142 not recirculated back to hydrodynamic heater 30 is returned to vehicle cooling system 136 and water pump 140 through exit heater hose 180.

With reference to FIG. 14, operating the heating system 224 with the hydrodynamic heater 30 deactivated (i.e., rotor 52 not rotating and positioned stationary relative to stator 50) causes the cooling fluid 142 discharged from heat exchanger 142 to substantially bypass hydrodynamic heater 30 and return to vehicle cooling system 136 and water pump 140 through exit heater hose 180. With the hydrodynamic heater 30 deactivated substantially all the heat transferred to airstream 182 is generated within vehicle cooling system 136.

With reference to FIGS. 15 and 16, an alternately configured heating system 234 may include hydrodynamic heater 30 fluidly connected in parallel with the heat exchanger 176. Inlet heater hose 178 may fluidly connect vehicle cooling system 136 and water pump 140 to inlet 179 of heat exchanger 176. Exit heater hose 180 fluidly connects heat exchanger outlet port 181 to vehicle cooling system 136 and water pump 140. Inlet port 190 of fluid pump 188 may be fluidly connected to exit heater hose 180 at fluid junction 226 through a first inlet hose 228a, and outlet port 194 of fluid pump 188 may be fluidly connected to inlet passage 38 of hydrodynamic heater 30 through a second inlet hose 228b. Outlet passage 42 of hydrodynamic heater 30 may be fluidly connected to inlet heater hose 178 at fluid junction 230 through outlet heater hose 232. Second inlet hose 228b may include check valve 198 fluidly connected to outlet port 194 of fluid pump 188 and inlet passage 38 of hydrodynamic heater 30. Check valve 198 may be configured to allow cooling fluid 142 to flow from fluid pump 188 to hydrodynamic heater 30, while substantially blocking a flow of fooling fluid 142 in an opposite direction from hydrodynamic heater 30 to fluid pump 188.

Heating system 234 may be operated in a semi-dedicated mode, in which at least a portion of the cooling fluid 142 discharged from heat exchanger 176 is recirculated back to hydrodynamic heater 30 through fluid pump 188 and bypasses vehicle cooling system 136. FIG. 15 schematically illustrates heating system 234 operating in the semi-dedicated mode. FIG. 16 schematically illustrates heating system 234 operating with hydrodynamic heater 30 deactivated.

With reference to FIG. 15, when operating heating system 234 in the semi-dedicated mode, activating hydrodynamic heater 30 (i.e., causing rotor 52 to rotate relative to stator 50) causes pressurized cooling fluid 142 from fluid pump 188 to pass through second inlet hose 228b and check valve 198 and delivered to hydrodynamic heater 30 through inlet passage 38. Heated fluid discharged from hydrodynamic heater 30 through outlet passage 42 mixes with the cooling fluid 142 from water pump 140 at fluid junction 230 and travels through inlet heater hose 178 to heat exchanger 176. The heated cooling fluid 142 enters heat exchanger 176 through inlet port 179. Heat from the cooling fluid 142 may be transferred to airstream 182 as the cooling fluid 142 flows through heat exchanger 176. The cooling fluid 142 is discharged from outlet port 181 of heat exchanger 176 into exit heater hose 180. At fluid junction 226 a portion of the cooling fluid 142 is recirculated to fluid pump 188 through first inlet hose 228a. The cooling fluid 142 is discharged from fluid pump 188 and travels through second inlet hose 228b and check valve 198 to hydrodynamic heater 30, where it is heated and directed back to heat exchanger 176. The portion cooling fluid 142 not recirculated back to hydrodynamic heater 30 is returned to vehicle cooling system 136 and water pump 140 through exit heater hose 180.

With reference to FIG. 16, operating heating system 234 with the hydrodynamic heater 30 deactivated (i.e., rotor 52 not rotating and positioned stationary relative to stator 50) causes the cooling fluid 142 discharged from heat exchanger 176 to substantially bypass hydrodynamic heater 30 and return to vehicle cooling system 136 and water pump 140 through exit heater hose 180. With the hydrodynamic heater 30 deactivated substantially all the heat transferred to airstream 182 is generated within vehicle cooling system 136.

With reference to FIGS. 17 and 18, an alternately configured heating system 236 may include hydrodynamic heater 30 fluidly connected in parallel with the heat exchanger 176. Heating system 236 may include a control valve 238 for selectively controlling that amount of cooling fluid 142 flowing to vehicle cooling system 136 through exit heater hose 180. Control valve 238 enables heating system 236 to operate in a fully dedicated mode.

With continued reference to FIGS. 17 and 18, inlet heater hose 178 may fluidly connect vehicle cooling system 136 and water pump 140 to inlet 179 of heat exchanger 176. Exit heater hose 180 fluidly connects heat exchanger outlet port 181 to vehicle cooling system 136 and water pump 140. Inlet port 190 of fluid pump 188 may be fluidly connected to exit heater hose 180 at fluid junction 226 through a first inlet hose 228a, and outlet port 194 of fluid pump 188 may be fluidly connected to inlet passage 38 of hydrodynamic heater 30 through a second inlet hose 228b. Outlet passage 42 of hydrodynamic heater 30 may be fluidly connected to inlet heater hose 178 at fluid junction 230 through outlet heater hose 232. Second inlet hose 228b may include check valve 198 fluidly connected to outlet port 194 of fluid pump 188 and inlet passage 38 of hydrodynamic heater 30. Check valve 198 may be configured to allow cooling fluid 142 to flow from fluid pump 188 to hydrodynamic heater 30, while substantially blocking a flow of cooling fluid 142 in an opposite direction from hydrodynamic heater 30 to fluid pump 188.

Control valve 238 may include an inlet port 240 fluidly connecting control valve 238 to fluid junction 226 and an outlet port 242 fluidly connecting control valve 238 to vehicle cooling system 136 and water pump 140. Control valve 238 may have any of a variety of configurations, and may include for example, mechanical, electro-mechanical, hydraulic and pneumatic actuated devices. Control valve 238 may be selectively operated to control the flow of cooling fluid 142 passing from fluid junction 226 to vehicle cooling system 136 and water pump 140 through exit heater hose 180. Operation of control valve 238 may be controlled by a separate controller, such as, for example, control unit 48 (see FIG. 2) used to control operation of hydrodynamic heater 30.

Control valve 238 may be selectively adjusted between an open position, in which cooling fluid 142 discharged from heat exchanger 176 is allowed to pass through control valve 238 to vehicle cooling system 136 and water pump 140, and a closed position in which the cooling fluid 142 is substantially blocked from flowing through control valve 238 from fluid junction 226 to vehicle cooling system 136 and water pump 140. Control valve 238 may be infinitely adjustable between the open and closed positions.

Heating system 236 may be operated in a dedicated mode, in which substantially all the cooling fluid 142 discharged from heat exchanger 176 bypasses vehicle cooling system 136 and water pump 140 and is redirected through fluid pump 188 back to hydrodynamic heater 30. FIG. 17 schematically illustrates heating system 236 operating in the dedicated mode.

Heating system 236 may also be operated in a semi-dedicated mode, in which a portion of the cooling fluid 142 discharged from heat exchanger 176 is recirculated back to hydrodynamic heater 30 and the remaining portion is directed back to vehicle cooling system 136. FIG. 18 schematically illustrates heating system 234 operating in the semi-dedicated mode.

With reference to FIG. 17, when operating heating system 236 in the dedicated mode, fluid pump 188 may be operated to produce a stream of pressurized fluid for delivery to hydrodynamic heater 30. Vehicle pump 140 may or may not be operating. Activating hydrodynamic heater 30 (i.e., causing rotor 52 to rotate relative to stator 50) causes pressurized cooling fluid 142 from fluid pump 188 to pass through second inlet hose 228b and check valve 198 to be delivered to hydrodynamic heater 30 through inlet passage 38. Hydrodynamic heater 30 heats the fluid in the previously describe manner. The heated cooling fluid 142 may be discharged from outlet passage 42 of hydrodynamic heater 30 and passes through outlet hose 232 to fluid junction 230 where the fluid enters inlet heater hose 178. The cooling fluid 142 enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into exit heater hose 180. At fluid junction 226 the cooling fluid 142 is recirculated back to fluid pump 188 where it is pressurized. Cooling fluid 142 is prevented from flowing through exit heater hose 180 from fluid junction 226 to vehicle cooling system 136 and water pump 140 by control valve 238. Control valve 238 is arranged in the closed position when heating system 236 is operated in the dedicated mode. Pressurized cooling fluid 142 discharged from fluid pump 188 passes through check valve 198 and is returned to hydrodynamic heater 30 through second inlet hose 228b.

With reference to FIG. 18, when operating heating system 236 in the semi-dedicated mode, activating hydrodynamic heater 30 (i.e., causing rotor 52 to rotate relative to stator 50) causes pressurized cooling fluid 142 from fluid pump 188 to pass through second inlet hose 228b and check valve 198 to be delivered to hydrodynamic heater 30 through inlet passage 38. Heated cooling fluid 142 discharged from hydrodynamic heater 30 passes through outlet passage 42 of hydrodynamic heater 30 and mixes with the cooling fluid 142 from water pump 140 at fluid junction 230. The cooling fluid 142 travels through inlet heater hose 178 to heat exchanger 176 and enters heat exchanger 176 through inlet port 179. Heat from the cooling fluid 142 may be transferred to airstream 182 as the cooling fluid 142 flows through heat exchanger 176. The cooling fluid 142 may be discharged from outlet port 181 of heat exchanger 176 into exit heater hose 180. At fluid junction 226 a portion of the cooling fluid 142 is recirculated back to fluid pump 188 through first inlet hose 228a. The cooling fluid 142 may be discharged from fluid pump 188 and travel through second inlet hose 228b and check valve 198 to hydrodynamic heater 30, where it is heated and directed back to heat exchanger 176. The portion of cooling fluid 142 not recirculated back to hydrodynamic heater 30 through fluid pump 188 is returned to vehicle cooling system 136 and water pump 140 through exit heater hose 180.

Operating heating system 236 with the hydrodynamic heater 30 deactivated (i.e., rotor 52 not rotating and positioned stationary relative to stator 50) causes the cooling fluid 142 discharged from heat exchanger 142 to substantially bypass hydrodynamic heater 30 and return to vehicle cooling system 136 and water pump 140 through exit heater hose 180. With the hydrodynamic heater 30 deactivated substantially all the heat transferred to airstream 182 is generated within vehicle cooling system 136.

With reference to FIGS. 19 and 20, an alternately configured heating system 244 may include hydrodynamic heater 30 fluidly connected in parallel with the heat exchanger 176. Heating system 244 employ control valve 238 for selectively controlling that amount of cooling fluid 142 flowing from vehicle cooling system 136 through inlet heater hose 178. Control valve 238 enables heating system 236 to operate in a fully dedicated mode.

With continued reference to FIGS. 19 and 20, inlet heater hose 178 may fluidly connect vehicle cooling system 136 and water pump 140 to inlet 179 of heat exchanger 176. Exit heater hose 180 fluidly connects heat exchanger outlet port 181 to vehicle cooling system 136 and water pump 140. Inlet port 190 of fluid pump 188 may be fluidly connected to exit heater hose 180 at fluid junction 226 through a first inlet hose 228a, and outlet port 194 of fluid pump 188 may be fluidly connected to inlet passage 38 of hydrodynamic heater 30 through a second inlet hose 228b. Outlet passage 42 of hydrodynamic heater 30 may be fluidly connected to inlet heater hose 178 at fluid junction 230 through outlet heater hose 232. Second inlet hose 228b may include check valve 198 fluidly connected to outlet port 194 of fluid pump 188 and inlet passage 38 of hydrodynamic heater 30. Check valve 198 may be configured to allow cooling fluid 142 to flow from fluid pump 188 to hydrodynamic heater 30, while substantially blocking a flow of cooling fluid 142 in an opposite direction from hydrodynamic heater 30 to fluid pump 188.

Inlet port 240 fluidly connects control valve 238 to vehicle cooling system 136 and water pump 140 and outlet port 242 fluidly connects control valve 238 to fluid junction 230. Control valve 238 may be selectively operated to control the flow of cooling fluid 142 passing from vehicle cooling system 136 and water pump 140 through inlet heater hose 178 to fluid junction 230. Operation of control valve 238 may be controlled by a separate controller, such as, for example, control unit 48 (see FIG. 2) used to control operation of hydrodynamic heater 30.

Control valve 238 may be selectively adjusted between an open position, in which cooling fluid 142 is allowed to flow through inlet heater hose 178 from vehicle cooling system 136 and water pump 140 to fluid junction 230, and a closed position in which the cooling fluid 142 is substantially blocked from flowing through control valve 238 from vehicle cooling system 136 and water pump 140 to fluid junction 230. Control valve 238 may be infinitely adjustable between the open and closed positions.

Heating system 244 may be operated in a dedicated mode, in which substantially all the cooling fluid 142 discharged from heat exchanger 176 bypasses vehicle cooling system 136 and water pump 140 and is redirected through fluid pump 188 back to hydrodynamic heater 30. FIG. 19 schematically illustrates heating system 244 operating in the dedicated mode.

Heating system 244 may also be operated in a semi-dedicated mode, in which a portion of the cooling fluid 142 discharged from heat exchanger 176 is recirculated back to hydrodynamic heater 30 and the remaining portion is directed back to vehicle cooling system 136 though exit heater hose 180. FIG. 20 schematically illustrates heating system 244 operating in the semi-dedicated mode.

With reference to FIG. 19, when operating heating system 244 in the dedicated mode, fluid pump 188 may be operated to produce a stream of pressurized fluid for delivery to hydrodynamic heater 30. Vehicle pump 140 may or may not be operating. Activating hydrodynamic heater 30 (i.e., causing rotor 52 to rotate relative to stator 50) causes pressurized cooling fluid 142 from fluid pump 188 to pass through second inlet hose 228b and check valve 198 to be delivered to hydrodynamic heater 30 through inlet passage 38. Hydrodynamic heater 30 heats the fluid in the previously describe manner. The heated cooling fluid 142 may be discharged from outlet passage 42 of hydrodynamic heater 30 and passes through outlet hose 232 to fluid junction 230 where the fluid enters inlet heater hose 178. Cooling fluid 142 from vehicle cooling system 136 and water pump 140 is prevented from flowing through inlet heater hose 178 to fluid junction 230 by control valve 238. Control valve 238 is arranged in the closed position when heating system 244 is operated in the dedicated mode. The cooling fluid 142 enters heat exchanger 176 at inlet port 179. Heat from the cooling fluid 142 is transferred to airstream 182 as the cooling fluid 142 flows through heat exchanger 176. The cooling fluid 142 is discharged from outlet port 181 of the heat exchanger 176 into exit heater hose 180. At fluid junction 226 the cooling fluid 142 is recirculated back to fluid pump 188 where it is pressurized. Pressurized cooling fluid 142 discharged from fluid pump 188 passes through check valve 198 and is returned to hydrodynamic heater 30 through second inlet hose 228b.

With reference to FIG. 20, when operating heating system 244 in the semi-dedicated mode, activating hydrodynamic heater 30 (i.e., causing rotor 52 to rotate relative to stator 50) causes pressurized cooling fluid 142 from fluid pump 188 to pass through second inlet hose 228b and check valve 198 to be delivered to hydrodynamic heater 30 through inlet passage 38. Heated cooling fluid 142 discharged from hydrodynamic heater 30 passes through outlet passage 42 of hydrodynamic heater 30 and mixes with the cooling fluid 142 from water pump 140 at fluid junction 230. The cooling fluid 142 travels through inlet heater hose 178 to heat exchanger 176 and enters heat exchanger 176 through inlet port 179. Heat from the cooling fluid 142 may be transferred to airstream 182 as the cooling fluid 142 flows through heat exchanger 176. The cooling fluid 142 may be discharged from outlet port 181 of heat exchanger 176 into exit heater hose 180. At fluid junction 226 a portion of the cooling fluid 142 is recirculated back to fluid pump 188 through first inlet hose 228a. The cooling fluid 142 may be discharged from fluid pump 188 and travel through second inlet hose 228b and check valve 198 to hydrodynamic heater 30, where it is heated and directed back to heat exchanger 176. The portion of cooling fluid 142 not recirculated back to hydrodynamic heater 30 through fluid pump 188 is returned to vehicle cooling system 136 and water pump 140 through exit heater hose 180.

Operating heating system 244 with the hydrodynamic heater 30 deactivated (i.e., rotor 52 not rotating and positioned stationary relative to stator 50) causes the cooling fluid 142 discharged from heat exchanger 142 to substantially bypass hydrodynamic heater 30 and return to vehicle cooling system 136 and water pump 140 through exit heater hose 180. With the hydrodynamic heater 30 deactivated substantially all the heat transferred to airstream 182 is generated within vehicle cooling system 136.

Figure 21:
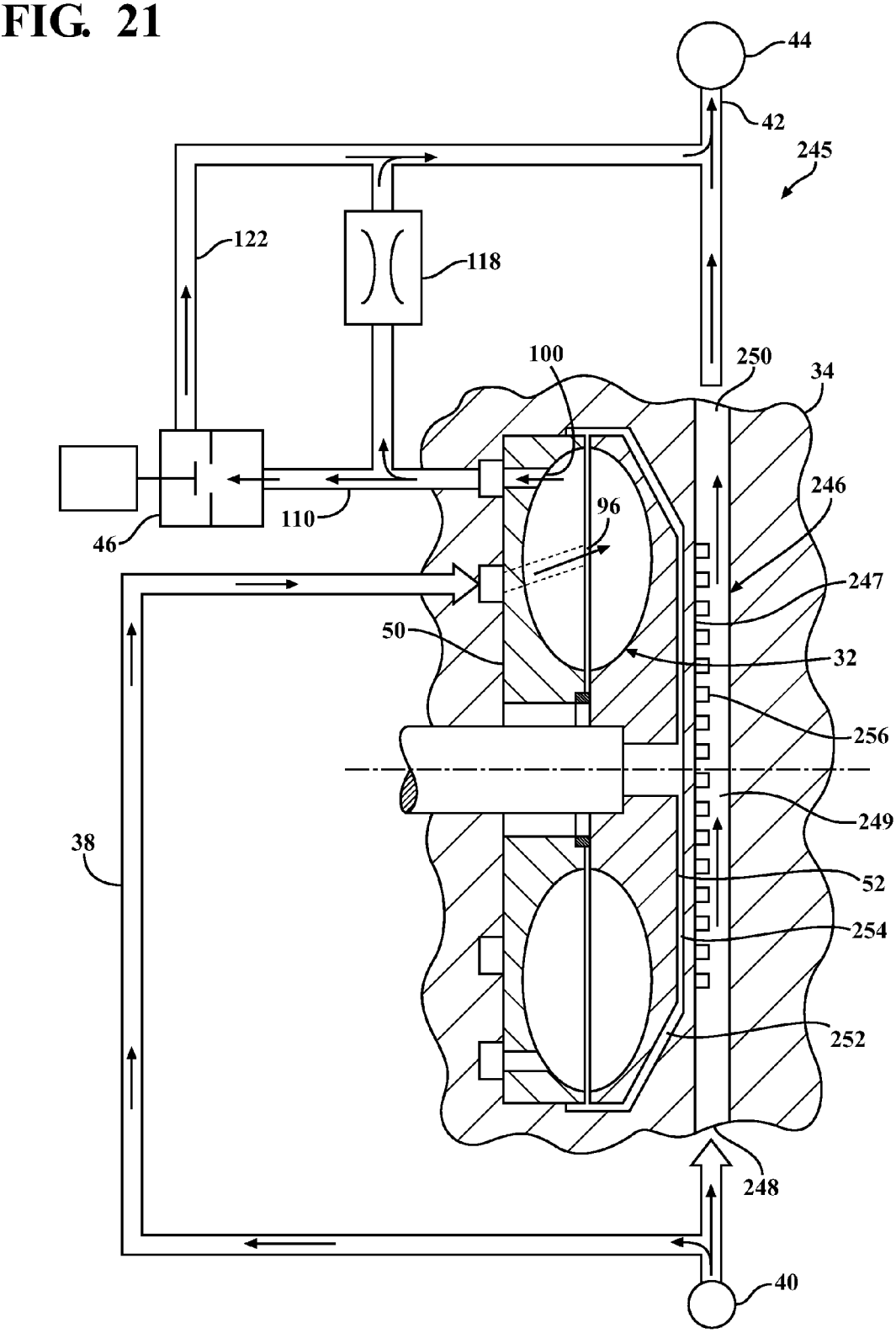
FIG. 21 is a schematic illustration of an alternately configured hydrodynamic heater employing an integrated heat exchanger fluidly connected in parallel to a hydrodynamic chamber of the hydrodynamic heater.

With reference to FIG. 21, alternately configured hydrodynamic heater 245 may include an integrated heat exchanger 246 operable for enhancing heat transfer from hydrodynamic chamber 32 to a fluid passing through hydrodynamic heater 245. Hydrodynamic heater 245 may be configured and operate substantially the same as hydrodynamic heater 30. Heat exchanger 246 may be fluidly connected in parallel with hydrodynamic chamber 32, such that a portion of fluid entering hydrodynamic heater 245 through inlet port 40 bypasses hydrodynamic chamber 32 and flows through heat exchanger 246. Fluid discharged from heat exchanger 246 combines with the fluid discharged from hydrodynamic chamber 32 prior to exiting hydrodynamic heater 245 through outlet port 44.

Heat exchanger 246 may be positioned within housing 34 of hydrodynamic heater 245 adjacent rotor 52. Rotor 52 may be located axially along axis of rotation 56 between stator 50 and heat exchanger 246. A housing wall 247 at least partially defines an interior region 249 of heat exchanger 246 and is positioned between rotor 52 and interior region 249 of heat exchanger 246.

Heat exchanger 246 may include an inlet port 248 fluidly connecting the heat exchanger to inlet port 40 of hydrodynamic heater 245, and an outlet port 250 fluidly connecting the heat exchanger to outlet port 44 of hydrodynamic heater 245. Heat generated within hydrodynamic chamber 32 may pass through rotor 52 to fluid present within a cavity 252 located between a back surface 254 of rotor 52 and housing wall 247. Also, heated fluid discharged from hydrodynamic chamber 32 through an opening 251 between stator 50 and rotor 52 may be carried by the fluid to cavity 252. Heat may pass from the fluid present within cavity 252 through housing wall 247 to heat exchanger 246, where a portion of the heat is transferred to the fluid passing through heat exchanger 246.

A heat transfer effectiveness of heat exchanger 246 may be enhanced by employing various geometric surface features to increase a heat transfer surface area of the heat exchanger and the turbulence of the fluid passing through the heat exchanger. For example, the heat transfer surface area of heat exchanger 246 may be increased by employing a heat transfer surface extender 256, which operates to increase the available surface area for transferring heat to fluid flowing through heat exchanger 246. Heat transfer surface extender 256 may include any of a variety of configurations, including but not limited to, pins, fins and ribs, and may include other surface enhancing configurations designed to enhance heat transfer. The heat transfer surface extenders 256 may also operate to increase turbulence of the fluid passing through the heat exchange, which may in turn increase the heat transfer effectiveness of the heat exchanger.

Upon initiating operation of hydrodynamic heater 245 (i.e., causing rotor 52 to rotate relative to stator 50) fluid from an external fluid source may enter hydrodynamic heater 245 at inlet port 40. The fluid is divided after entering inlet port 40, with a portion entering heat exchanger 246 at inlet port 248 and the remaining portion flowing to hydrodynamic chamber 32 through inlet passage 38. The portion of fluid passing through heat exchanger 246 may be discharged through outlet port 250 and flow to outlet port 44 of hydrodynamic heater 245.

The portion of the fluid directed to hydrodynamic chamber 32 may be discharged into hydrodynamic chamber 32 at hydrodynamic chamber inlet port 96. Heated fluid present within hydrodynamic chamber 32 may be discharged through hydrodynamic outlet port 100 and pass through control valve inlet passage 110. Depending on the adjusted position of control valve 46 (i.e., open or closed), a portion of the heated fluid may pass through control valve 46 to control valve outlet passage 110, with the remaining portion flowing from control valve inlet passage 110 through fluid metering device 118 to outlet port 44. Heated fluid discharged from hydrodynamic chamber 32 may combine with the heated fluid discharged from heat exchanger 246 and to be discharged from hydrodynamic heater 245 through outlet port 44.

Figure 22:
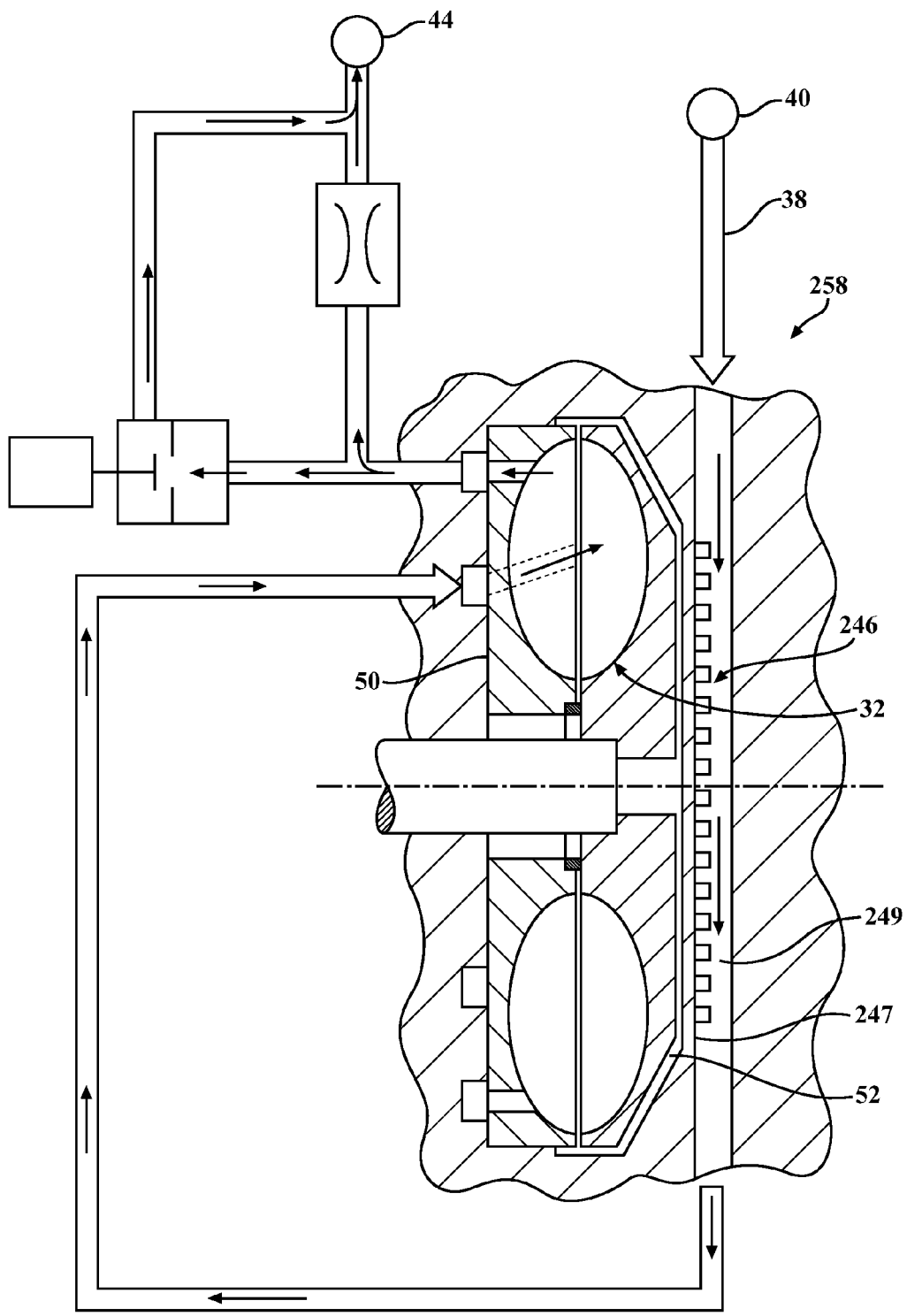
FIG. 22 is a schematic illustration of an alternately configured hydrodynamic heater employing an integrated heat exchanger fluidly connected in series to a hydrodynamic chamber of the hydrodynamic heater.

With reference to FIG. 22, an alternately configured hydrodynamic heater 258 may include integrated heat exchanger 246 fluidly connected in series with hydrodynamic chamber 32, such that all the fluid entering hydrodynamic heater 258 through inlet port 40 first passes through heat exchanger 246 prior to passing through hydrodynamic chamber 32. Hydrodynamic heater 258 may be similarly configured as hydrodynamic heater 245; with the exception that heat exchanger 246 is connected in series, rather than parallel, with hydrodynamic chamber 32. Fluid entering hydrodynamic heater 258 through inlet port 40 first passes through heat exchanger 246 and then passes through hydrodynamic chamber 32. Heated fluid may be discharged from hydrodynamic heater 258 through outlet port 44.

Figure 23:
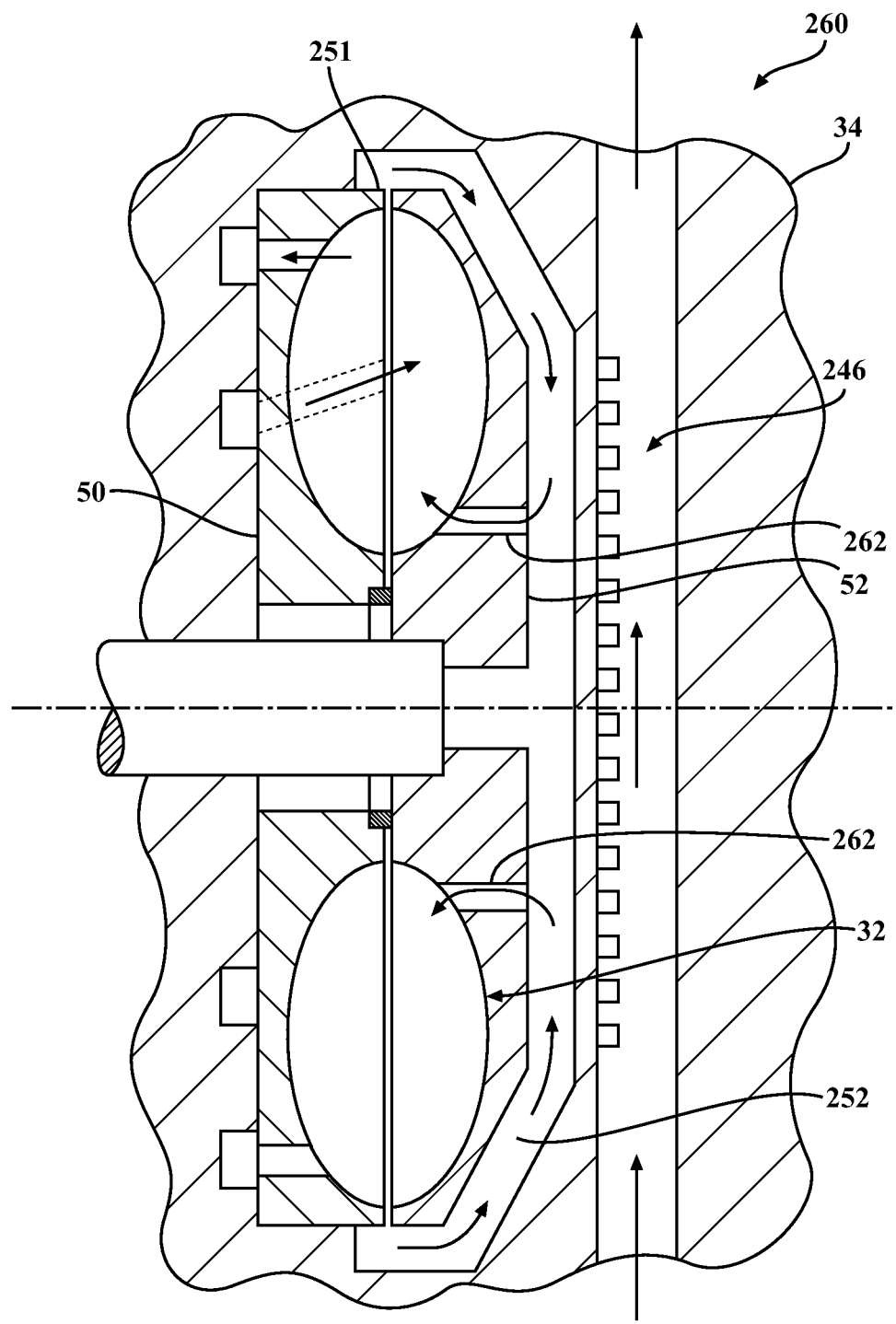
FIG. 23 is a schematic illustration of an alternately configured hydrodynamic heater employing a recirculation passage to enhance heat transfer between a hydrodynamic chamber of the hydrodynamic heater and an integrated heat exchanger.

With reference to FIG. 23, an alternately configured hydrodynamic heater 258 may include one or more recirculating passages 262 for enhancing circulation of warm fluid passing through cavity 252 between stator 52 and housing 34. This may help improve the heat transfer between hydrodynamic chamber 32 and heat exchanger 246. Hydrodynamic heater 258 may be configured and operate substantially the same as hydrodynamic heaters 30, 245 and 260. Recirculating passages 262 operate to fluidly connect cavity 252 to hydrodynamic chamber 32. Fluid from hydrodynamic dynamic chamber 32 may be discharged through an opening 264 occurring between stator 50 and rotor 52. Opening 264 fluidly connects hydrodynamic chamber 32 to cavity 252. The fluid discharged from hydrodynamic chamber 32 through opening 264 may flow through cavity 252 recirculating passage 262. The fluid passes through recirculation passages 262 and is returned to hydrodynamic chamber 32. Hydrodynamic heaters 245 and 260 may be configured to include recirculating passages 262 to help enhance heat transfer between hydrodynamic chamber 32 and heat exchanger 246.

It is intended that the scope of the present methods and apparatuses be defined by the following claims. However, it must be understood that the disclosed hydrodynamic heater, heating systems and methods of use may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A hydrodynamic heater comprising:
a hydrodynamic heater inlet port for receiving a stream of fluid from an external source;

a hydrodynamic heater outlet port operable for discharging a stream of heated fluid from the hydrodynamic heater;

a hydrodynamic chamber operable to selectively heat a fluid present within an interior region of the hydrodynamic chamber when operating the hydrodynamic heater, the hydrodynamic chamber including a hydrodynamic chamber inlet port located proximate a center of the interior region of the hydrodynamic chamber and a hydrodynamic chamber outlet port located along an interior wall of the hydrodynamic chamber, the hydrodynamic chamber inlet port fluidly connected to the hydrodynamic heater inlet port;

a control valve including a control valve inlet port fluidly connected to the hydrodynamic chamber outlet port and a control valve outlet port fluidly connected to the hydrodynamic heater outlet port; and a fluid metering device having a fluid metering device inlet port fluidly connected to the hydrodynamic chamber outlet port and a fluid metering device outlet port fluidly connected to the hydrodynamic heater outlet port.

2. The hydrodynamic heater of claim 1 further comprising:
a stator; and
a rotor coaxially aligned with and located adjacent the stator, the rotor operably rotatable about an axis of rotation relative to the stator, wherein the rotor and stator at least partially define the interior region of the hydrodynamic chamber.

3. The hydrodynamic heater of claim 2 further comprising a heat exchanger located adjacent a back surface of the rotor, a wall of the heat exchanger and the back surface of the rotor at least partially defining a fluid cavity operable to transfer heat from the hydrodynamic chamber to the heat exchanger.

4. The hydrodynamic heater of claim 3, wherein the heat exchanger further includes a heat exchanger inlet port fluidly connected to hydrodynamic heater inlet port and a heat exchanger outlet port fluidly connected to the hydrodynamic heater outlet port.

5. The hydrodynamic heater of claim 3, wherein the heat exchanger further includes a heat exchanger inlet port fluidly connected to the hydrodynamic heater inlet port and a heat exchanger outlet port fluidly connected to the hydrodynamic chamber inlet port.

6. The hydrodynamic heater of claim 3, wherein the rotor includes a recirculating passage fluidly connecting the fluid cavity with the interior region of the hydrodynamic chamber.

7. The hydrodynamic heater of claim 3, wherein the wall of the heat exchanger includes one or more heat transfer enhancing devices.

8. The hydrodynamic heater of claim 3, wherein the rotor is located axially along the axis of rotation between the stator and the heat exchanger.

9. The hydrodynamic heater of claim 1, wherein the control valve is selectively adjustable between a closed position for substantially blocking a flow of fluid from the hydrodynamic chamber through the control valve.

10. The hydrodynamic heater of claim 9, wherein the metering device includes a fixed fluid thru-flow area that remains substantially open when operating the hydrodynamic chamber.

11. The hydrodynamic heater of claim 1, wherein the control valve and the fluid metering device are fluidly connected in parallel to the hydrodynamic chamber outlet port.

12. The hydrodynamic heater of claim 1, wherein the hydrodynamic chamber outlet port is located in an outer half of the hydrodynamic chamber.

13. The hydrodynamic heater of claim 1, wherein the hydrodynamic chamber outlet port is located along an interior back wall of the stator.

14. The hydrodynamic heater of claim 1, wherein the control valve selectively operates to control distribution of fluid discharged from the hydrodynamic chamber through the hydrodynamic chamber outlet port between the control valve inlet port and the metering orifice inlet port.

15. The hydrodynamic heater of claim 1, wherein at least a portion of the fluid discharged from the hydrodynamic chamber outlet port passes through the fluid metering device outlet port when the hydrodynamic chamber is operating.

16. The hydrodynamic heater of claim 1, wherein the fluid metering device is continuously open to allow fluid to pass through the fluid metering device when operating the hydrodynamic chamber.

17. A hydrodynamic heating system comprising:
a hydrodynamic heater comprising:
a hydrodynamic heater inlet port for receiving a stream of fluid from an external source;
a hydrodynamic heater outlet port operable for discharging a stream of heated fluid from the hydrodynamic heater;
a hydrodynamic chamber operable to selectively heat a fluid present within an interior region of the hydrodynamic chamber when operating the hydrodynamic heater, the hydrodynamic chamber including a hydrodynamic chamber inlet port located proximate a center of the interior region of the hydrodynamic chamber and a hydrodynamic chamber outlet port located along an interior wall of the hydrodynamic chamber, the hydrodynamic chamber inlet port fluidly connected to the hydrodynamic heater inlet port;
a control valve including a control valve inlet port fluidly connected to the hydrodynamic chamber outlet port and a control valve outlet port fluidly connected to the hydrodynamic heater outlet port; and
a fluid metering device having a fluid metering device inlet port fluidly connected to the hydrodynamic chamber outlet port and a fluid metering device outlet port fluidly connected to the hydrodynamic heater outlet port;
a first pump operable for delivering a stream of pressurized fluid to the hydrodynamic heater, the first pump including a first pump outlet port fluidly connected to the hydrodynamic heater inlet port and a first pump inlet port; and
a heat exchanger including a heat exchanger inlet port fluidly connected to the hydrodynamic heater outlet port and a heat exchanger outlet port fluidly connected to the first pump inlet port.

18. The hydrodynamic heating system of claim 17 further comprising a second pump operable for delivering a stream of pressurized fluid to the hydrodynamic heater, the second pump including a second pump inlet port fluidly connected to the heat exchanger outlet port and a second pump outlet port fluidly connected to the hydrodynamic heater inlet port.

19. The hydrodynamic heating system of claim 18 further comprising a check valve fluidly connected to the second pump outlet port and the hydrodynamic heater inlet port, the check valve configured to substantially block a flow of fluid through the check valve toward the second pump while allowing fluid to flow through the check valve from the second pump to the hydrodynamic heater.

20. The hydrodynamic heating system of claim 18 further comprising a valve having a valve inlet port fluidly connected to the heat exchanger outlet port, a valve first outlet port fluidly connected to the second pump inlet port and a valve second outlet port fluidly connected to the first pump inlet port.

21. The hydrodynamic heating system of claim 20, wherein the valve is selectively adjustable between a dedicated position, in which the valve first outlet port is open and the valve second outlet port is substantially closed, and a non-dedicated position, in which the valve first outlet port is substantially closed and the valve second outlet port is open.

22. The hydrodynamic heating system of claim 18 further comprising a valve including a valve inlet port fluidly connected to the first pump outlet port, a valve first outlet port fluidly connected to the hydrodynamic heater inlet port and a valve second outlet port fluidly connected to the first pump inlet port.

23. The hydrodynamic heating system of claim 22, wherein the valve is a thermally actuated valve responsive to a temperature of fluid received at the valve inlet port.

24. The hydrodynamic heating system of claim 22, wherein the valve is adjustable between a fully dedicated position, in which the valve first outlet port is substantially closed and the valve second outlet port is open, and a semi-dedicated position, in which the valve first outlet port is open and the valve second outlet port is substantially closed.

25. A hydrodynamic heating system comprising:
a hydrodynamic heater comprising:
a hydrodynamic heater inlet port for receiving a stream of fluid from an external source;
a hydrodynamic heater outlet port operable for discharging a stream of heated fluid from the hydrodynamic heater;
a hydrodynamic chamber operable to selectively heat a fluid present within an interior region of the hydrodynamic chamber when operating the hydrodynamic heater, the hydrodynamic chamber including a hydrodynamic chamber inlet port located proximate a center of the interior region of the hydrodynamic chamber and a hydrodynamic chamber outlet port located along an interior wall of the hydrodynamic chamber, the hydrodynamic chamber inlet port fluidly connected to the hydrodynamic heater inlet port;
a control valve including a control valve inlet port fluidly connected to the hydrodynamic chamber outlet port and a control valve outlet port fluidly connected to the hydrodynamic heater outlet port; and
a fluid metering device having a fluid metering device inlet port fluidly connected to the hydrodynamic chamber outlet port and a fluid metering device outlet port fluidly connected to the hydrodynamic heater outlet port;
a first pump operable for delivering a stream of pressurized fluid, the first pump including a first pump outlet port and a first pump inlet port; and
a heat exchanger including a heat exchanger inlet port fluidly connected to the hydrodynamic heater outlet port and the first pump outlet port, and a heat exchanger outlet port fluidly connected to hydrodynamic heater inlet port and the first pump inlet port.

26. The hydrodynamic heating system of claim 25 further comprising a second pump operable for delivering a stream of pressurized fluid to the hydrodynamic heater, the second pump including a second pump inlet port fluidly connected to the heat exchanger outlet port and a second pump outlet port fluidly connected to the hydrodynamic heater inlet port.

27. The hydrodynamic heating system of claim 26 further comprising a check valve fluidly connected to the second pump outlet port and the hydrodynamic heater inlet port, the check valve configured to substantially block a flow of fluid through the check valve toward the second pump while allowing fluid to flow through the check valve from the second pump to the hydrodynamic heater.

28. The hydrodynamic heating system of claim 26 further comprising a valve having a valve inlet port fluidly connected to the heat exchanger outlet port and a valve outlet port fluidly connected to the first pump inlet port.

29. The hydrodynamic heating system of claim 28, wherein the valve is selectively adjustable between an open position in which fluid discharged from the heat exchanger is allowed to pass through the valve to the first pump and a closed position in which fluid is substantially blocked from flowing through the valve to the first pump.

30. The hydrodynamic heating system of claim 26 further comprising a valve having a valve inlet port fluidly connected to the first pump outlet port and a valve outlet port fluidly connected to the heat exchanger inlet port.

31. The hydrodynamic heating system of claim 30, wherein the valve is selectively adjustable between an open position in which fluid discharged from the first pump is allowed to pass through the valve to the heat exchanger and a closed position in which fluid is substantially blocked from flowing through the valve to the heat exchanger.

32. The hydrodynamic heating system of claim 25 further comprising a check valve fluidly connected to the heat exchanger outlet port and the hydrodynamic heater inlet port, the check valve configured to substantially block a flow of fluid through the check valve from the hydrodynamic heater toward the heat exchanger, while allowing fluid to flow through the check valve from the heat exchanger to the hydrodynamic heater.

* * * * *